United States Patent
Arai et al.

(10) Patent No.: US 10,138,344 B2
(45) Date of Patent: Nov. 27, 2018

(54) PARTICULATE POLYAMIDE, AND METHOD FOR PREPARING THE PARTICULATE POLYAMIDE

(71) Applicants: Yoko Arai, Shizuoka (JP); Atsumi Yamabe, Kanagawa (JP); Koichiro Oyama, Kanagawa (JP); Yasuo Kamada, Shizuoka (JP)

(72) Inventors: Yoko Arai, Shizuoka (JP); Atsumi Yamabe, Kanagawa (JP); Koichiro Oyama, Kanagawa (JP); Yasuo Kamada, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 198 days.

(21) Appl. No.: 15/075,045

(22) Filed: Mar. 18, 2016

(65) Prior Publication Data

US 2016/0272776 A1 Sep. 22, 2016

(30) Foreign Application Priority Data

Mar. 19, 2015 (JP) .................. 2015-055551
Apr. 15, 2015 (JP) .................. 2015-083124
Jan. 13, 2016 (JP) .................. 2016-004568

(51) Int. Cl.
| | |
|---|---|
| *C08J 9/12* | (2006.01) |
| *B29C 44/00* | (2006.01) |
| *C08J 9/20* | (2006.01) |
| *C08G 69/24* | (2006.01) |
| *C08G 69/18* | (2006.01) |
| *C08G 69/22* | (2006.01) |
| *C08L 77/02* | (2006.01) |

(52) U.S. Cl.
CPC .............. *C08J 9/122* (2013.01); *B29C 44/00* (2013.01); *C08G 69/18* (2013.01); *C08G 69/22* (2013.01); *C08G 69/24* (2013.01); *C08J 9/20* (2013.01); *C08L 77/02* (2013.01); *C08J 2203/06* (2013.01); *C08J 2377/02* (2013.01)

(58) Field of Classification Search
CPC . C08J 9/122; C08J 9/20; C08J 2203/06; C08J 2377/02; B29C 44/00; C08G 69/18; C08G 69/22; C08G 69/24
USPC ....................................... 428/402
See application file for complete search history.

(56) References Cited

U.S. PATENT DOCUMENTS

| 7,250,240 B2 * | 7/2007 | Tosaka ................ G03G 9/0819 399/252 |
| 8,822,555 B2 | 9/2014 | Kaiso et al. |
| 2014/0093820 A1 * | 4/2014 | Satoh .................. G03G 9/0825 430/113 |

FOREIGN PATENT DOCUMENTS

| JP | 47-006040 | 4/1972 |
|---|---|---|
| JP | S47-6040 | * 4/1972 |
| JP | 6-066801 | 3/1994 |
| JP | 7-318560 | 12/1995 |
| JP | 2000-019175 | 1/2000 |
| JP | 2000-356638 | 12/2000 |
| JP | 2002-082117 | 3/2002 |
| JP | 2002-148266 | 5/2002 |
| JP | 2003-055478 | 2/2003 |
| JP | 2003-199600 | 7/2003 |
| JP | 2003-225099 | 8/2003 |
| JP | 2003-247993 | 9/2003 |
| JP | 2003-247994 | 9/2003 |
| JP | 2003-247997 | 9/2003 |
| JP | 2003-247998 | 9/2003 |
| JP | 2007-024498 | 2/2007 |
| JP | 2007-064827 | 3/2007 |
| JP | 2007-512390 | 5/2007 |
| JP | 2009-264879 | 11/2009 |
| JP | 2010-515877 | 5/2010 |
| JP | 2010-185028 | 8/2010 |
| JP | 2010-256309 | 11/2010 |
| JP | 2011-005855 | 1/2011 |
| JP | 2011-218330 | 11/2011 |
| JP | 2012-037511 | 2/2012 |
| JP | 2012-189346 | 10/2012 |
| JP | 2013-181870 | 9/2013 |
| WO | WO2005/037894 A1 | 4/2005 |
| WO | WO2007/072922 A1 | 6/2007 |
| WO | WO2008/049083 A2 | 4/2008 |
| WO | WO2012/157576 A1 | 11/2012 |

* cited by examiner

*Primary Examiner* — Leszek B Kiliman
(74) *Attorney, Agent, or Firm* — Cooper & Dunham LLP

(57) ABSTRACT

A particulate polyamide is provided. The particulate polyamide is porous and includes at least one of polyamide 4 and polyamide 3. In addition, the particulate polyamide has a particle diameter (d50) of from 10 μm to 1,000 μm and a particle diameter dispersion degree (Dv/Dn) of not greater than 3.0, wherein Dv represents the volume average particle diameter of the particulate polyamide, and Dn represents the number average particle diameter of the particulate polyamide.

20 Claims, 9 Drawing Sheets

PARTICULATE POLYAMIDE, AND METHOD FOR PREPARING THE PARTICULATE POLYAMIDE

CROSS-REFERENCE TO RELATED APPLICATIONS

This patent application is based on and claims priority pursuant to 35 U.S.C. § 119 to Japanese Patent Application No. 2015-055551, 2015-083124, and 2016-004568, filed on Mar. 19, 2015, Apr. 15, 2015, and Jan. 13, 2016, respectively, in the Japan Patent Office, the entire disclosure of which is hereby incorporated by reference herein.

BACKGROUND

Technical Field

This disclosure relates to a particulate polyamide, and to a method for preparing the particulate polyamide.

Description of the Related Art

Particulate polyamide produces good light scattering effect while having good absorption ability (such as oil absorption ability), and therefore it is considered to use particulate polyamide as an adsorbent or a component of cosmetics such as foundation cream or cleansing cream.

In addition, polyamide 4 (i.e., nylon 4) which is a polymer of 2-pyrrolidone, and polyamide 3 (i.e., nylon 3) which is a polymer of 2-azetidinone can decompose in soil while having good hygroscopic property.

With respect to the method for preparing polyamide 4, a method including polymerizing 2-pyrrolidone in the presence of a basic catalyst and an acyl compound is proposed. In addition, a method in which a salt is added during a processing to enhance the processability is also proposed.

SUMMARY

As an aspect of this disclosure, a particulate polyamide is provided which includes at least one of a polyamide 4 and a polyamide 3 and which is porous and has a particle diameter (d50) of from 10 µm to 1,000 µm and a particle diameter dispersion degree (Dv/Dn) of not greater than 3.0, wherein Dv represents the volume average particle diameter of the particulate polyamide and Dn represents the number average particle diameter of the particulate polyamide.

As another aspect of this disclosure, a method for preparing the particulate polyamide is provided which includes contacting a base material mixture, which includes a monomer including at least one of 2-pyrrolidone and 2-azetidinone, and a basic polymerization catalyst, with a compressible fluid including carbon dioxide and having a density of not less than 450 kg/m$^3$ to melt or dissolve the base material mixture in the compressible fluid and to subject the monomer to a ring-opening polymerization reaction.

The aforementioned and other aspects, features and advantages will become apparent upon consideration of the following description of the preferred embodiments taken in conjunction with the accompanying drawings.

DETAILED DESCRIPTION

Figure 1:
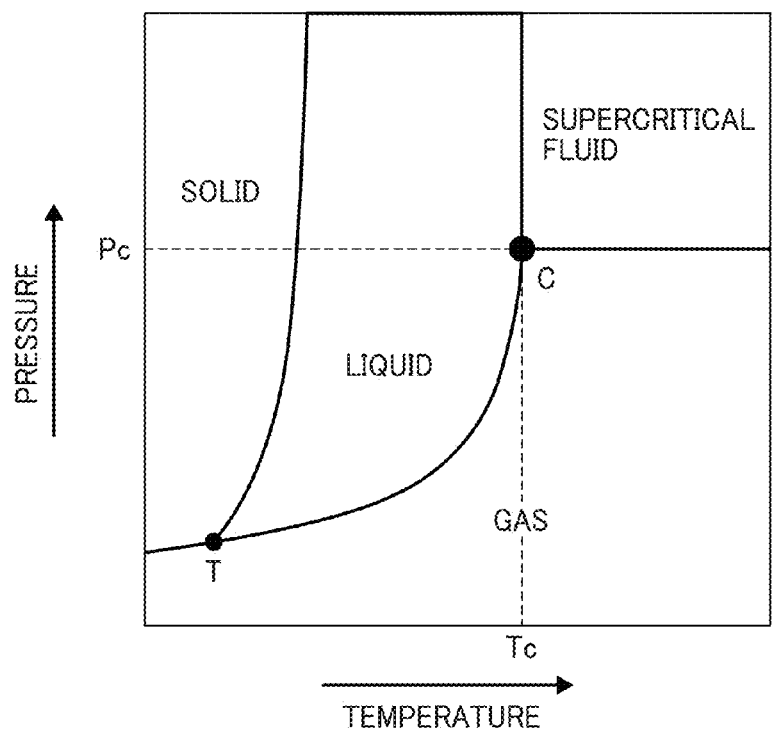
FIG. 1 is a phase diagram illustrating states of a material when temperature and pressure are changed.

The object of this disclosure is to provide a particulate polyamide, which includes a polyamide 4 and/or a polyamide 3 and which is porous while having a relatively small average particle diameter and a narrow particle diameter distribution.

Initially, the particulate polyamide of this disclosure will be described.

The particulate polyamide of this disclosure includes at least one of a polyamide 4 and a polyamide 3 and is porous while having a particle diameter (d50) of from 10 to 1,000 μm and a particle diameter dispersion degree of not greater than 3.0.

The particle diameter (d50) is the median diameter, which means a cumulative 50 vol % diameter. Specifically, in the particle diameter distribution curve (on a volume basis) of a particulate material, the median diameter is defined as a particle diameter at which the total volume of particles having diameters greater than the particle diameter is equal to the total volume of particles having diameters less than the particle diameter.

The particle diameter dispersion degree means a ratio (Dv/Dn) of the volume average particle diameter (Dv) of a particulate material to the number average particle diameter (Dn) of the particulate material. In this regard, the mean volume diameter and the mean number diameter are arithmetic average particle diameters on a volume or number basis. As the particle diameter dispersion degree decreases (i.e., becomes closer to 1), the particulate material has a sharper particle diameter distribution.

The particle diameter (d50), the mean volume diameter, and the mean number diameter of a particulate polyamide can be measured by a method including dispersing the particulate polyamide in a proper solvent (such as water and alcohols) using a dispersing machine such as ultrasonic dispersing machines to prepare a dispersion liquid, and measuring the particle diameter distribution of the particulate polyamide in the dispersion liquid with a particle diameter distribution measuring instrument such as laser scattering particle size distribution analyzers.

"Porous" means that a material has a number of fine pores therein. Whether or not a material is porous can be determined by observing the material with a scanning electron microscope.

The particulate polyamide of this disclosure includes at least one of a polyamide 4 and a polyamide 3.

Polyamide 4 and polyamide 3 decompose in soil, and therefore polyamide 4 and polyamide 3 hardly become a burden on the environment. In addition, polyamide 4 and polyamide 3 have good hygroscopic property, and therefore polyamide 4 and polyamide 3 are nice and soft.

In contrast, polyamide 6 and polyamide 12 which are popular polyamides, do not decompose in soil, and therefore polyamide 6 and polyamide 12 become a burden on the environment.

The polyamide 4 and the polyamide 3 included in the particulate polyamide of this disclosure is not particularly limited, and can be homopolymers, copolymers, and branched polymers. Specific examples of the polyamide 4 and the polyamide 3 include the following.

(1) Polymers and copolymers of 2-pyrrolidone
(I-1) Polymers and copolymers of 2-pyrrolidone having a methylol group which can optionally have a substituent.
(I-2) Polymers and copolymers described in paragraph (I-1), which have a methylol group which can be acylated, etherified, urethanated or carbonated, wherein the modified methylol group can optionally have a functional group.
(I-3) Polymers and copolymers described in paragraph (I-1) or (I-2), which have a linear or branched structure.
(I-4) Copolymers described in any one of paragraphs (I-1) to (I-3), which are copolymers with a lactam compound or a lactone compound.
(I-5) Copolymers described in paragraph (I-4), wherein the lactam compound is ε-caprolactam.
(I-6) Copolymers described in paragraph (I-4), wherein the lactone compound is ε-caprolactone.

(II-1) Polymers and copolymers of 2-pyrrolidone treated with a carbodiimide compound.
(II-2) Polymers and copolymers described in paragraph (II-1), wherein the carbodiimide compound is N,N'-dicyclohexylcarbodiimide.
(II-3) Polymers and copolymers described in paragraph (II-1) or (II-2), which have a linear or branched structure.
(II-4) Copolymers described in any one of paragraphs (II-1) to (II-3), which are copolymers with a lactam compound.
(II-5) Copolymers described in paragraph (II-4), wherein the lactam compound is ε-caprolactam.
(II-6) Copolymers described in any one of paragraphs (II-1) to (II-3), which are copolymers with a lactone compound.
(II-7) Copolymers described in paragraph (II-6), wherein the lactone compound is ε-caprolactone.

In this regard, the decomposition property of the above-mentioned copolymers and branched polymers and copolymers in soil often deteriorates.

The particle diameter (d50) of the particulate polyamide of this disclosure is from 10 μm to 1,000 μm, preferably from 10 μm to 100 μm, and even more preferably from 10 μm to 50 μm.

When the particle diameter (d50) is from 10 μm to 1,000 μm, the particulate polyamide has good absorption ability while having good handling property. In addition, when an active ingredient is included in the particulate polyamide so that the particulate polyamide emits the active ingredient little by little, the particulate polyamide has an ability to control the speed of emitting the active ingredient (i.e., ability to gradually emit the active ingredient, hereinafter referred to as gradual emission controlling ability). When the particle diameter (d50) is from 10 μm to 100 μm, the gradual emission controlling ability of the particulate polyamide can be further enhanced.

When the particle diameter (d50) of the particulate polyamide is less than 10 μm or greater than 1,000 μm, the handling property and the gradual emission controlling ability tend to deteriorate.

The particulate polyamide of this disclosure has a particle diameter dispersion degree of not greater than 3.0, and preferably not greater than 2. When the particle diameter dispersion degree is not greater than 3.0, the particulate polyamide has good absorption ability while having good gradual emission controlling ability. When the particle diameter dispersion degree is not greater than 2, the gradual emission controlling ability of the particulate polyamide can be further enhanced.

When the particle diameter dispersion degree is greater than 3.0, the absorption ability and the gradual emission controlling ability tend to deteriorate.

The particulate polyamide of this disclosure is porous, and therefore the particulate polyamide has good absorption ability. If the particulate polyamide is not porous, the absorption ability of the particulate polyamide deteriorates.

The particulate polyamide of this disclosure may have a substantially spherical form. In this application, a particulate material having "a substantially spherical form" is defined as follows. Specifically, when the particulate material is observed from such a direction that the area of the projected image of the particulate material is maximal, the particulate material has a circular form, and in addition when the particulate material is observed from such a direction that the area of the projected image of the particulate material is minimal, the particulate material also has a circular form. Further, provided that the diameter (maximum diameter) of the particulate material is D1 when the particulate material is observed from such a direction that the area of the projected image is maximal, and the diameter (maximum diameter) of the particulate material is D2 when the particulate material is observed from such a direction that the area of the projected image is minimal, the following relationship is satisfied.

$$(D1-D2)/D1 \leq 0.15.$$

The particle diameter D1 and the particle diameter D2 of a particulate material can be determined by observing the particulate material with a scanning electron microscope (SEM). Specifically, randomly selected 30 particles of the particulate material are observed with a SEM, and the ratio (D1−D2)/D1 of each particle is determined, followed by averaging the 30 data of the ratio. When the particulate material satisfies the relationship mentioned above, the particulate material is considered as a particulate material having a substantially spherical form in this application.

When the particulate polyamide of this disclosure has a non-spherical form, the adhesiveness of the particulate polyamide is enhanced.

One preferable example of the particulate polyamide having a non-spherical form is a non-spherical particulate polyamide which has a circular form when the particulate polyamide is observed from such a direction that the area of the projected image of the particulate polyamide is maximal and which has a non-circular form when the particulate polyamide is observed from such a direction that the area of the projected image of the particulate polyamide is minimal. In this regard, the "circular form" satisfies the following relationship:

$$(H1/D3) \leq 0.15,$$

wherein H1 represents the true circularity degree (defined in JIS B 0621) of the projected image, and D3 represents the maximum diameter of the projected image. Namely, when the particulate polyamide is observed from such a direction that the area of the projected image of the particulate polyamide is maximal, the maximum diameter D3 is equal to the maximum diameter D1 mentioned above. In addition, when the particulate polyamide is observed from such a direction that the area of the projected image of the particulate polyamide is minimal, the maximum diameter D3 is equal to the maximum diameter D2 mentioned above.

The true circularity degree (H1) of a projected image is determined as the minimum value of difference (in units of mm) between the radius of a circumscribed circle and the radius of an inscribed circle of the projected image, wherein the circumscribed circle and the inscribed circle are concentric circles.

Specific examples of the "non-circular form" include forms having a recessed portion, hemispherical forms, polyhedral forms, biconvex lens forms, bale forms, etc.

Specific examples of the above-mentioned non-spherical particulate material (polyamide) are illustrated in FIGS. 6-9.

Figure 6A:
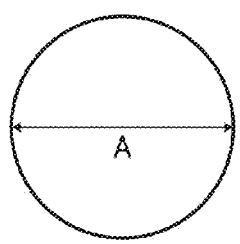
FIGS. 6A and 6B illustrate a particulate material which has a circular form as illustrated in FIG. 6A when observed from such a direction that the area of the projected image of the particulate material is maximal and which has a non-circular form as illustrated in FIG. 6B when observed from such a direction that the area of the projected image of the particulate material is minimal.
Figure 6B:
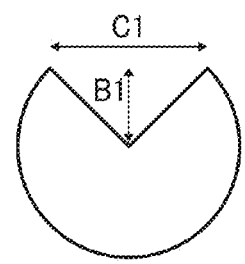

FIG. 6A illustrates a particulate polyamide having a non-circular form, which is observed from such a direction that the area of the projected image of the particulate polyamide is maximal and which has a circular form, and FIG. 6B illustrates the particulate polyamide from such a direction that the area of the projected image of the particulate polyamide is minimal and which has a non-circular form. In FIG. 6A, character A represents the maximum diameter of the particulate polyamide when the particulate polyamide is observed from the direction such that the area of the projected image of the particulate polyamide is maximal. It can be understood that the particulate polyamide illustrated in FIGS. 6A and 6B is a non-spherical particulate polyamide having one recessed portion (notch).

Figure 7A:
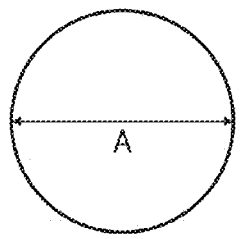
FIGS. 7A and 7B illustrate another particulate material which has a circular form as illustrated in FIG. 7A when observed from such a direction that the area of the projected image of the particulate material is maximal and which has a non-circular form as illustrated in FIG. 7B when observed from such a direction that the area of the projected image of the particulate material is minimal.
Figure 7B:
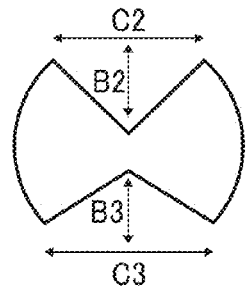

FIGS. 7A and 7B illustrate a non-spherical particulate polyamide having two recessed portions (notches).

In FIGS. 6B and 7B, characters B1, B2 and B3 represent depths of the notches. Each of the depths B1, B2 and B3 is preferably from 0.1 A to 0.9 A, wherein A represents the maximum diameter of the particulate polyamide as described above. Characters C1, C2 and C3 represent widths of the notches. Each of the widths C1, C2 and C3 is preferably from 0.01 A to 0.95 A.

The number of notches present in one particle of the non-spherical particulate polyamide is preferably from 1 to 100. When two or more notches are present, the forms of the notches may be the same as or different from each other. Specifically, in FIG. 7B, the depth B2 may be the same as or different from the depth B3, and the width C2 may be the same as or different from the width C3.

The shape of the notch is not particularly limited, and may be a notch having a corner such as notches having a triangular form, a quadrangular form, etc., or a notch having no corner such as notches having a semi-circular form.

Figure 8A:
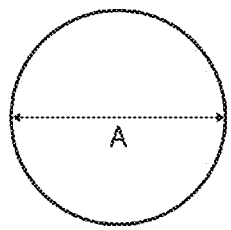
FIGS. 8A and 8B illustrate another particulate material which has a circular form as illustrated in FIG. 8A when observed from such a direction that the area of the projected image of the particulate material is maximal and which has a non-circular form as illustrated in FIG. 8B when observed from such a direction that the area of the projected image of the particulate material is minimal.
Figure 8B:
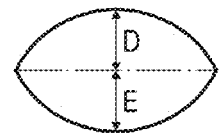

FIGS. 8A and 8B illustrate a non-spherical particulate polyamide which has a biconvex lens form when observed from such a direction that the area of the projected image of the particulate material is minimal. Characters D and E represent heights of the particulate polyamide from the center thereof. Each of the heights D and E is preferably from 0.1 A to 0.8 A, wherein A represents the maximum diameter of the particulate polyamide. The height D may be the same as or different from the height E.

Figure 9A:
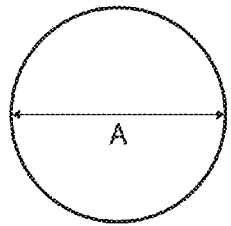
FIGS. 9A and 9B illustrate another particulate material which has a circular form as illustrated in FIG. 9A when observed from such a direction that the area of the projected image of the particulate material is maximal and which has a non-circular form as illustrated in FIG. 9B when observed from such a direction that the area of the projected image of the particulate material is minimal.
Figure 9B:
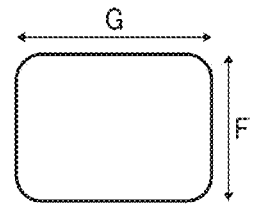

FIGS. 9A and 9B illustrate a non-spherical particulate polyamide which has a bale form when observed from such a direction that the area of the projected image of the particulate material is minimal. Characters F and G represent a shorter side length and a longer side length of the bale-form particulate polyamide, respectively. Each of the lengths F and G is preferably from 0.1 A to 0.8 A, wherein A represents the maximum diameter of the particulate polyamide. The length F may be the same as or different from (less than) the length G.

The shape of a particulate polyamide can be determined by observing the particulate polyamide with an electron microscope or the like. In addition, the lengths A to G can be determined from cross-sectional slices of the particulate polyamide. Specifically, randomly selected 30 particles of a particulate polyamide are observed with an electron microscope, and the lengths A to G of the particles are measured. In this regard, the number of notches present in the particulate polyamide is the average of 30 data of the 30 particles, and the length (diameter) A of the particulate polyamide is the average of 30 data of the 30 particles. The length (depth) B of notches present in the particulate polyamide is the maximum and minimum values in the data of the 30 particles. In addition, the length (width) C of notches present in the particulate polyamide is the maximum and minimum values in the data of the 30 particles. The cross-sectional slice can be prepared by a focused ion beam system (FIB).

The particulate polyamide of this disclosure preferably has a specific surface area of not less than 10 m$^2$/g, and more preferably not less than 20 m$^2$/g. When the specific surface area is not less than 10 m$^2$/g, the absorption ability of the particulate polyamide is enhanced.

The specific surface area can be measured by a gas absorption method using a nitrogen gas, and is determined as the BET (Brunauer-Emmett-Teller) specific surface area.

Figure 13:
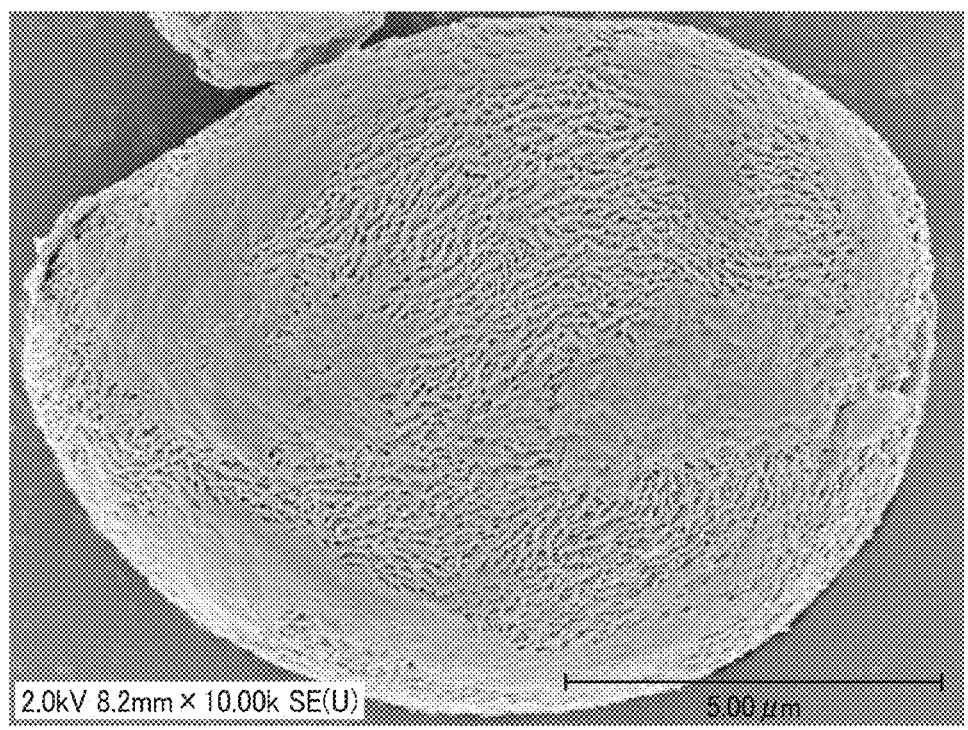
FIG. 13 is an electron micrograph of a particulate polyamide of Example 10.

The particulate polyamide of this disclosure includes fine pores therein. When a curve showing a relation between the diameter (in units of nanometer) of pores and the frequency of the pores is described (for example, such a curve as illustrated in FIG. 13), a pore diameter peak ratio ($P_H/P_L$) of the value of a peak ($P_H$) in a relatively high diameter range of not less than 100 nm to the value of a peak ($P_L$) in a relative low diameter range of not greater than 50 nm is preferably not less than 0.7 (i.e., 70%).

The pore diameter distribution can be measured by a gas absorption method, and is determined by the BJH (Barrett-Joyner-Halenda) analysis method.

The frequency peaks ($P_H$ and $P_L$) can be determined from a pore diameter distribution curve on a volume basis.

The pore diameter peak ratio ($P_H/P_L$) is more preferably not less than 0.8 (80%).

The pore diameter peak ratio ($P_H/P_L$) can be not less than 1.0.

In order to increase the amount of a material absorbed by the particulate polyamide and to enhance the gradual emission controlling ability of the particulate polyamide, the pore diameter peak ratio ($P_H/P_L$) is preferably not less than 0.7 (70%).

When the pore diameter peak ratio ($P_H/P_L$) is less than 0.7, the absorption ability of the particulate polyamide tends to deteriorate because the number of relatively large pores decreases.

The particulate polyamide of this disclosure preferably has a hollow therein, namely, the particulate polyamide preferably has a shell structure. The shell preferably has a thickness (t) of from T/10 to T/3, wherein T represents the outer diameter of the particulate polyamide. Namely, the ratio (t/T) is preferably from 1/10 to 1/3.

The ratio (t/T) can be calculated by the following equation.

$$t/T = (T-h)/2/T,$$

wherein h represents the diameter of the hollow.

The diameter (T) of the particulate polyamide and the diameter (h) of the hollow can be determined by observing a cross-sectional slice, which is prepared by a microtome, with an electron microscope. In this regard, the diameter (T) of the particulate polyamide and the diameter (h) of the hollow are the maximum diameters thereof when the diameters vary depending on the measurement points.

The diameters T and h are determined by averaging 30 data of 30 randomly selected particles of the particulate polyamide.

The ratio (t/T) is preferably from 1/10 to 1/3, and more preferably from 1/8 to 1/5.

When the ratio (t/T) is from 1/10 to 1/3, occurrence of a problem in that the particulate polyamide is easily damaged by friction because of being brittle can be prevented, and the particulate polyamide can bear a sufficient amount of ingredient such as medical agents.

The pores in the shell of a particle of the particulate polyamide preferably communicate with the hollow of the particle because the particle can quickly bear a sufficient amount of ingredient. In this regard, the pores in the shell preferably extend radially while communicating with the hollow so that the particle can quickly bear a sufficient amount of ingredient. Whether or not the pores communicate with the hollow can be determined by observing a cross-sectional slice prepared by a method such as FIB.

When the particulate polyamide has a hollow therein, the particulate polyamide can bear an ingredient in the hollow, and therefore the specific surface area of the particulate polyamide may be less than 10 m²/g.

Next, the method of preparing the particulate polyamide of this disclosure will be described.

The particulate polyamide can be prepared by a method including preparing a base material mixture including a monomer including at least one of 2-pyrrolidone and 2-azetidinone and a basic polymerization catalyst; and contacting the base material mixture with a compressible fluid including carbon dioxide and having a density of not less than 450 kg/m³ to melt the base material mixture or to dissolve the base material mixture in the compressible fluid while subjecting the monomer to ring-opening polymerization.

When a polyamide 4 is prepared by a conventional method, a problem in that an agglomerated polyamide is formed in the polymerizing process and therefore particles of polyamide 4 cannot be produced is caused.

As a result of the present inventors' diligent investigation, it is found that by polymerizing 2-pyrrolidone or 2-azetidinone in a compressible fluid including carbon dioxide and having a high density, a particulate polyamide which is porous while having a particle diameter (d50) of from 10 μm to 1,000 μm and a particle diameter dispersion degree of not greater than 3.0 can be produced.

In order to prepare a particulate polyamide including a polyamide 4, 2-pyrrolidone is used as the monomer. In order to prepare a particulate polyamide including a polyamide 3, 2-azetidinone is used as the monomer. In order to prepare a particulate polyamide including a polyamide 4 and a polyamide 3, 2-pyrrolidone and 2-azetidinone are used as the monomer.

When the base material mixture is contacted with a compressible fluid including carbon dioxide and having a density of not less than 450 kg/m³ so as to be melted or dissolved therein, the base material mixture is dissolved or dispersed in the compressible fluid. Therefore, the monomer can be subjected to ring-opening polymerization while dispersed in the compressible fluid, and therefore a particulate polyamide can be prepared without forming agglomeration of polyamide.

In addition, by performing ring-opening polymerization by contacting the monomer with a compressible fluid including carbon dioxide and having a density of not less than 450 kg/m³, the resultant polyamide becomes porous.

Further, when a compressible fluid having a density of not less than 700 kg/m³, a particulate polyamide having a pore diameter peak ratio ($P_H/P_L$) of not less than 0.7 can be easily prepared. The density of the compressible fluid is more preferably not less than 800 kg/m³. In this case, the particle diameter dispersion degree (Dv/Dn) of the particulate polyamide can be enhanced (i.e., decreased). When the density is less than 450 kg/m³, the particulate polyamide tends to agglomerate (i.e., united particles of polyamide tend to be formed).

The density of the compressible fluid can be controlled by adjusting the temperature and pressure of the compressible fluid. The temperature of the compressible fluid is preferably not higher than 70° C., and more preferably not higher than 50° C. The pressure of the compressible fluid is preferably from 5 MPa to 30 MPa, and even more preferably from 20 MPa to 30 MPa.

Next, the base material mixture will be described.

The base material mixture includes at least 2-pyrrolidone and/or 2-azetidinone, and a basic polymerization catalyst, and optionally includes other components.

Suitable materials for use as the basic polymerization catalyst include catalysts used for anionic polymerization of lactam compounds. Specific examples of such catalysts include alkali metals (e.g., sodium, potassium and lithium), hydroxides, hydrides, oxides and salts of alkali metals (e.g., potassium hydroxide, sodium hydride, potassium methylate, sodium methylate, sodium pyrrolidone, potassium pyrrolidone, and sodium alkolate), hydrides of alkali earth metals (e.g., calcium hydride), basic organic metal compounds (e.g., alkyl lithium, alkyl potassium, alkyl sodium, alkyl aluminum, and n-butyl lithium), etc.

Among these compounds, metal salts of 2-pyrrolidone or 2-azetidinone are preferable because of having good ring-opening polymerization reactivity. Among the metal salts of 2-pyrrolidone or 2-azetidinone, alkali metal salts of 2-pyrrolidone or 2-azetidinone are more preferable, and potassium salts of 2-pyrrolidone or 2-azetidinone (i.e., potassium pyrrolidone and potassium azetidinone) are even more preferable. In addition, sodium hydride is also preferable because of having a good combination of handling property and polymerization property.

The added amount of such a basic polymerization catalyst is not particularly limited, but is preferably from 0.001 moles to 2 moles based on 1 mole of the monomer used (2-pyrrolidone and/or 2-azetidinone). When the added amount is in the preferable range, the monomer can polymerize quickly and the resultant polyamide has a relatively high molecular weight.

In addition, the shape of the particulate polyamide is influenced by the added amount of the basic polymerization catalyst used. When the added amount is less than 0.01 moles, the resultant polyamide tends to have a non-spherical form.

When the above-mentioned metal salts of 2-pyrrolidone or 2-azetidinone are used as the basic polymerization catalyst, the base material mixture can be prepared by reacting a metal alkoxide (e.g., alkoxides of alkali metals such as potassium and sodium) with an excessive amount of 2-pyrrolidone and/or 2-azetidinone. Among various alkoxides, alkoxides having 1 to 6 carbon atoms are preferable. Specific examples of the alkoxides having 1 to 6 carbon atoms include methoxides, ethoxides, and t-butoxides.

In addition, when an alkali metal salt is used as the basic polymerization catalyst, the resultant particulate polyamide tends to have a hollow therein.

Next, the activating agent will be described. When the particulate polyamide is prepared, it is preferable that 2-pyrrolidone and/or 2-azetidinone is subjected to ring-opening polymerization in the presence of an activating agent because the reaction can be performed at a high reaction rate.

In this application, carbon dioxide used for the compressible fluid is not the activating agent.

Among various activating agents, activating agents having an acyl group are preferable. Specific examples of such activating agents include halogenated carboxylic acids, carboxylic acid anhydrides, and carboxylic acid esters. Among these, halogenated carboxylic acids, and carboxylic acid esters are preferable.

Specific examples of such halogenated carboxylic acids include chlorinated carboxylic acids, fluorinated carboxylic acids, and brominated carboxylic acids. Among these, chlorinated carboxylic acids are preferable. Specific examples of such chlorinated carboxylic acids include benzoyl chloride.

In addition, carboxylic acid compounds having a group derived from 2-pyrrolidone and 2-azetidinone are preferable as the activating agent. Specific examples of such carboxylic acid compounds include N-acyl-2-pyrrolidone (e.g., 1-acetyl-2-pyrrolidone) and N-acyl-2-azetidinone (e.g., 1-acetyl-2-azetidinone), which are examples of activating agents having an acyl group.

The added amount of such an activating agent is not particularly limited, but is preferably not less than 0.0001 moles, and more preferably from 0.2 moles to 20 moles, based on 1 mole of the monomer used (2-pyrrolidone and/or 2-azetidinone). When the added amount is less than 0.02 moles, the resultant polyamide tends to have a hollow therein.

When the ring-opening polymerization is performed, an additive can be added if desired. Specific examples of such an additive include surfactants, antioxidants, stabilizers, antifog agents, ultraviolet absorbents, pigments, colorants, particulate inorganic materials, fillers, heat stabilizers, flame retardants, crystal nucleating agents, antistatic agents, wetting agents, incineration assisting agents, lubricants, natural materials, release agents, plasticizers, etc. In addition, polymerization terminators such as benzoic acid, hydrochloric acid, phosphoric acid, metaphosphoric acid, acetic acid, and lactic acid) can also be used as the additive, if desired. The added amount of such an additive changes depending on the purpose and property of the additive, but is preferably from 0 to 5 parts by weight based on 100 parts by weight of the particulate polyamide.

Specific examples of the above-mentioned stabilizers include epoxydized soybean oils, and carbodiimide.

Specific examples of the antioxidants include 2,6-di-t-butyl-4-methylphenol, and butylhydroxyanisole.

Specific examples of the antifog agents include glycerin fatty acid esters, and monostearyl citrate.

Specific examples of the fillers include clay, talc and silica, which can serve as an ultraviolet absorbent, a heat stabilizer, a flame retardant, an internal release agent, and a crystal nucleating agent.

Specific examples of the pigments include titanium oxide, carbon black and ultramarine.

Next, the compressible fluid for use in preparing the particulate polyamide of this disclosure will be described by reference to FIGS. 1 and 2.

Figure 2:
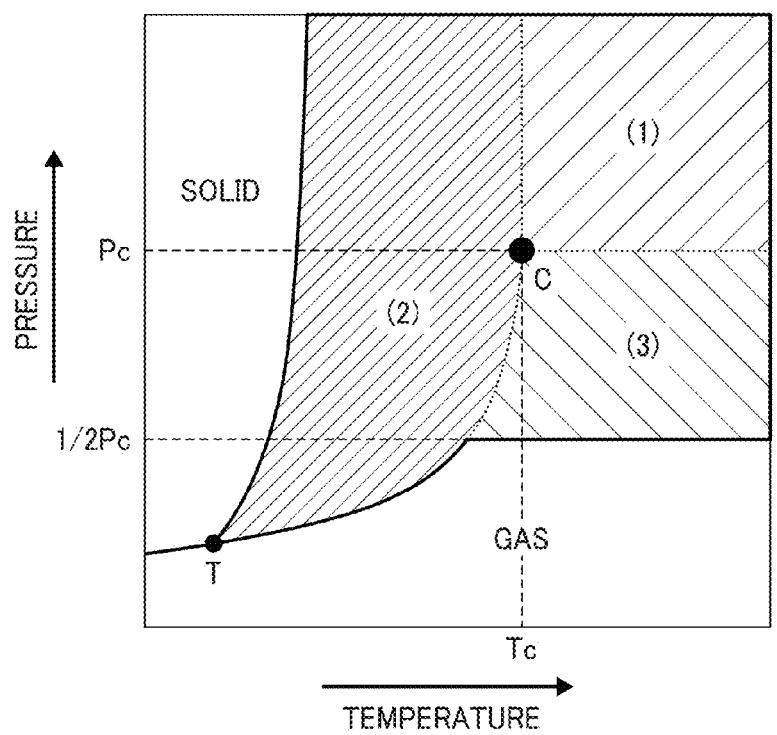
FIG. 2 is a phase diagram illustrating states of a compressible fluid for use in producing a particulate polyamide according to an embodiment when temperature and pressure are changed.

FIG. 1 is a phase diagram illustrating states of a material when temperature and pressure are changed, and FIG. 2 is a phase diagram illustrating states of a compressible fluid used for producing a polymer according to an embodiment when temperature and pressure are changed. In this application, the compressible fluid means the fluid in any one of the regions (states) (1), (2) and (3) illustrated in FIG. 2.

Specific examples of the material for use as the compressible fluid include carbon monoxide, carbon dioxide, dinitrogen monoxide, nitrogen, methane, ethane, propane, 2,3-dimethylbutane, and ethylene.

In the method of preparing the particulate polyamide of this disclosure, the compressible fluid preferably includes carbon dioxide in an amount of not less than 50% by weight to easily prepare the particulate polyamide.

In the region (1), (2) or (3) in FIG. 2, the material has a very high density, and exhibits behavior different from that at normal temperatures and pressures. A material in the region (1) is called a supercritical fluid. The supercritical fluid means a fluid which is present as a non-condensable high density fluid in a temperature/pressure region over a critical point C (illustrated in FIGS. 1 and 2) under which both a gas and a liquid of the material can exist and which is not condensed even when being compressed. A material in the region (2) is a liquid. In this embodiment, the material in the region (2) means a liquefied gas obtained by compressing a material, which is present as a gas at normal temperature (25° C.) and pressure (1 atm). A material in the region (3) is a gas. In this embodiment, the material in the region (3) means a high-pressure gas which has a pressure not lower than ½Pc, wherein Pc represents a critical pressure and is illustrated in FIGS. 1 and 2. In FIGS. 1 and 2, characters T and Tc respectively denote a triple point, and a critical temperature.

By adding such a compressible fluid to the ring-opening polymerization system, the ring-opening polymerization can be performed without using an organic solvent. In addition, the resultant polymer can be easily extracted from the system.

Next, the polymerization reaction apparatus for use in producing the particulate polyamide of this disclosure will be described by reference to FIGS. 3 and 4.

Initially, a continuous polymerization reaction apparatus for use in preparing the particulate polyamide of this disclosure will be described by reference to FIG. 3.

Figure 3:
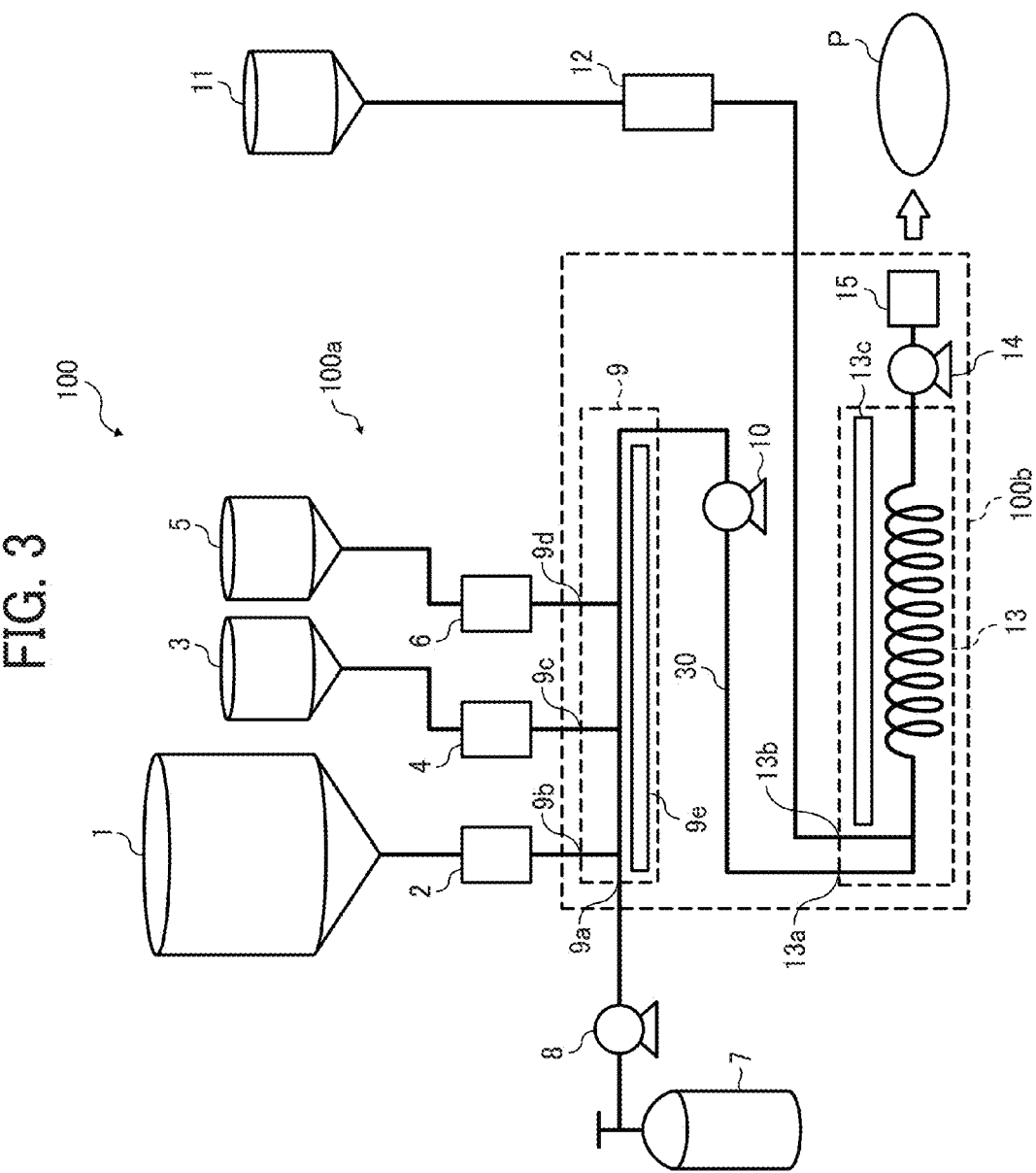
FIG. 3 is a schematic view illustrating a continuous polymerization system for use in producing the particulate polyamide.

FIG. 3 is a system diagram illustrating an example of the polymerization process. As mentioned above, when 2-pyrrolidone and/or 2-azetidinone are subjected to anionic polymerization by a conventional method, an agglomerated polyamide (massive polyamide) is formed in the polymerizing process, and therefore polyamide particles cannot be continuously produced. In contrast, by using the method of this embodiment using a polymerization reaction illustrated in FIG. 3, a particulate polymer can be continuously prepared.

The polymerization reaction apparatus 100 includes a supply unit 100a to supply raw materials (such as the base material mixture including a monomer including 2-pyrrolidone and/or 2-azetidinone, and other raw materials such as the activating agent and additives) and a compressible fluid, and a main body 100b (i.e., a continuous polymerization device) of the polymerization reaction apparatus to polymerize the monomer (such as 2-pyrrolidone and 2-azetidinone) supplied by the supply unit 100a. The supply unit 100a includes tanks 1, 3, 5, 7 and 11, measuring feeders 2 and 4, and measuring pumps 6, 8 and 12. The main body 100b includes a mixer 9 arranged at an end of the main body, a feed pump 10, a reaction container 13, a measuring pump 14, and an extrusion ring 15 which is arranged at the other end of the main body. In this embodiment, a device in which the compressible fluid and the raw materials (and/or the resultant polymer) are mixed to dissolve or melt the raw materials (and the resultant polymer) is called "a mixer." In addition, the term "melt" means that the raw materials (and/or resultant polymer) are swelled while plasticized and liquefied by being contacted with the compressible fluid. Further, the term "dissolve" means that the raw materials are dissolved in the compressible fluid.

The tank 1 of the supply unit 100a stores the base material mixture including 2-pyrrolidone and/or 2-azetidinone, and a basic polymerization catalyst. The base material mixture may be a powder or a liquid. The tank 3 stores a solid raw material (such as a powdery raw material and a particulate raw material) among the activating agent and additives used, and the tank 5 stores a liquid raw material among the activating agent and additives used. The tank 7 stores the compressible fluid. In this regard, the tank 7 may store a gas or a solid, which can be changed to a compressible fluid in a process of supply to the mixer 9 or by being heated or pressed in the mixer 9. In this case, the gas or solid in the tank 7, which is heated or pressed in the process of supply to the mixer or in the mixer, achieves the state (1), (2) or (3) illustrated in FIG. 2 in the mixer 9.

The measuring feeder 2 continuously supplies the base material mixture stored in the tank 1 to the mixer 9 while measuring the mixture. The measuring feeder 4 continuously supplies the solid raw material stored in the tank 3 to the mixer 9 while measuring the solid raw material. The measuring feeder 6 continuously supplies the liquid raw material stored in the tank 5 to the mixer 9 while measuring the liquid raw material. The measuring pump 8 continuously supplies the compressible fluid stored in the tank 7 to the mixer 9 at a predetermined pressure and a predetermined flow rate. In this regard, the term "continuous supply" means that the raw materials or the compressible fluid is supplied so that the polymer can be continuously produced unlike a batch polymerization reaction apparatus. Therefore, it is possible to intermittently supply the raw materials or the compressible fluid as long as the polymer can be continuously produced. In addition, when the activating agent and the additives used are solid, it is possible for the polymerization reaction apparatus 100 not to have the tank 5 and the measuring pump 6. Similarly, when the activating agent and the additives used are liquid, it is possible for the polymerization reaction apparatus 100 not to have the tank 3 and the measuring feeder 4.

In this embodiment, the devices of the main body 100b are connected with a pressure-resistant pipe 30 as illustrated in FIG. 3 to feed the raw materials, the compressible fluid, and the prepared polymer. In addition, each of the mixer 9, the feed pump 10, and the reaction container 13 has a pipe through which the above-mentioned raw materials, etc. are fed.

The mixer 9 of the main body 100b of the polymerization reaction apparatus continuously contacts the raw materials such as the base material mixture, the activating agent and the additives supplied from the tanks 1, 3 and 5 with the compressible fluid supplied from the tank 7 to dissolve or melt the raw materials. Therefore, the mixer 9 is a device having a pressure-resistant container. In the mixer 9, the raw materials are contacted with the compressible fluid, and thereby the raw materials are dissolved or melted. When the raw materials are dissolved, a fluidic phase is formed, and when the raw materials are melted, a molten phase is formed. In order that the reaction evenly proceeds, it is preferable that either the fluidic phase or the molten phase is formed. In this regard, in order that the reaction proceeds under a condition such that the ratio of the raw materials to the compressible fluid is high, the base material mixture is preferably melted in the mixer 9. In this embodiment, since the raw materials and the compressible fluid are continuously supplied, the raw materials and the compressible fluid can be contacted with each other in the mixer 9 while maintaining the ratio of the raw materials to the compressible fluid at a constant level, thereby making it possible to efficiently dissolve or melt the raw materials.

The container of the mixer 9 may be a tank type container or a cylindrical container. However, a cylindrical container in which the raw materials are supplied from one end thereof and the mixture is discharged from another end thereof is preferable. The container of the mixer 9 has an inlet 9a from which the compressible fluid in the tank 7 is supplied by the measuring pump 8, another inlet 9b from which the base material mixture in the tank 1 is supplied by the measuring feeder 2, another inlet 9c from which a powder in the tank 3 is supplied by the measuring feeder 4, and another inlet 9d from which a liquid in the tank 5 is supplied by the measuring pump 6. Each of the inlets 9a, 9b, 9c and 9d has a joint connecting the container of the mixer 9 with the pipe through which the raw materials or the compressible fluid is fed. The joint is not particularly limited, and any known joints such as reducer joints, coupling joints, Y joints, T joints, and outlet joints can be used. In addition, the mixer 9 has a heater 9e to heat the raw materials and the compressible fluid supplied. Further, the mixer 9 can have a stirrer to stir the raw materials and the compressible fluid. Specific examples of such a stirrer include single screw stirrers, twin screw stirrers in which two screws are engaged with each other, two shaft mixers having multiple stirring members engaged or overlapping with each other, kneaders having spiral stirring members engaged with each other, and static mixers. Among these, two- or more-shaft stirrers in which the stirring members are engaged with each other are preferable because the amount of the reaction product adhered to the stirrers or the container is small, and the stirrers have self-cleaning property.

When the mixer 9 has no stirrer, a pressure-resistant pipe is preferably used as the mixer. In this case, it is preferable that the pipe has a spiral form or is folded to reduce the installation space of the polymerization reaction apparatus 100 or to enhance the flexibility in layout of the apparatus. In addition, when the mixer 9 has no stirrer, it is preferable that the mixture of the raw materials supplied to the mixer 9 is previously liquefied so that the raw materials can be well mixed in the mixer.

The feed pump 10 feeds the raw materials, which are dissolved or melted in the mixer 9, to the reaction container 13. The tank 11 stores the activating agent. The measuring pump 12 supplies the activating agent stored in the tank 11 to the reaction container 13 while measuring the activating agent.

The reaction container 13 is a pressure-resistant container in which the dissolved or melted raw materials fed by the feed pump 10 and the activating agent supplied by the measuring pump 12 are mixed to continuously subject the monomer (2-pyrrolidone and/or 2-azetidinone) to ring-opening polymerization. The reaction container 13 can be a tank type container or a cylindrical container, but is preferably a cylindrical container because of having relatively small dead space.

The reaction container 13 has an inlet 13a from which the materials mixed in the mixer 9 are supplied to the reaction container, and another inlet 13b from which the activating agent in the tank 11 is supplied by the measuring pump 12. Each of the inlets 13a and 13b has a joint connecting the reaction container 13 with the pipe through which the raw materials are fed. The joint is not particularly limited, and any known joints such as reducer joints, coupling joints, Y joints, T joints, and outlet joints can be used.

The reaction container 13 can have a gas outlet from which a vaporized material is removed. In addition, the reaction container 13 has a heater 13c to heat the raw materials supplied. Further, the reaction container 13 can have a stirrer to stir the raw materials and the compressible fluid. When the reaction container 13 has a stirrer, it can be prevented that the produced polymer precipitates in the reaction container due to the difference in density between the raw materials and the polymer, and thereby the polymerization reaction can be evenly performed in a quantitative way.

Suitable stirrers for use as the stirrer of the reaction container 13 include stirrers having screws engaged with each other, stirrers having 2-flight (oval-shaped) or 3-flight (triangular shape) stirring members, and two- or more-shaft stirrers having a disk-shaped or multilobar-shaped stirring blade (e.g., cloverleaf stirring blade). These stirrers have good self-cleaning property. When the raw materials including the catalyst are previously mixed well, a static mixer which can perform separation and confluence of flow in a multistep way using a guiding device can be used as the stirrer. Specific examples of the static mixer include multi-stratification mixers disclosed in JP-S47-15526-B, JP-S47-15527-B and JP-S47-15528-B, KENICS MIXERS disclosed in JP-S47-33166-A, and other mixers having no moving member. In addition, examples of the static mixer are disclosed in U.S. Pat. Nos. 4,408,893, 5,944,419 and 5,851,067 incorporated by reference.

When the reaction container 13 has no stirrer, a pressure-resistant pipe is preferably used for the reaction container. In this case, it is preferable that the pipe has a spiral form or is folded to reduce the installation space of the polymerization reaction apparatus 100 or to enhance the flexibility in layout of the apparatus.

The polymerization reaction apparatus 100 illustrated in FIG. 3 includes only one reaction container 13. However, the number of the reaction container is not limited thereto, and two or more reaction containers can be used therefor. When multiple reaction containers 13 are used, the conditions (e.g., temperature, pressure, concentration of the catalyst, average retention time, and stirring speed) of the reactions performed in the reaction containers may be the same. However, it is preferable that the conditions are changed so as to be proper depending on the progression of the reactions in the reaction containers. It is not preferable that too many reaction containers are connected because the reaction time is increased and the apparatus is complicated, and the number of the reaction containers (i.e., the number of reaction steps) is preferably from 1 to 4, and more preferably from 1 to 3.

The measuring pump 14 discharges a particulate polyamide P from an outlet (the extrusion ring 15 in FIG. 3) of the reaction container 13. In this regard, it is possible to discharge the particulate polyamide P from the reaction container 13 without using the measuring pump 14 by utilizing pressure difference between the inside of the reaction container and the outside thereof. In this case, in order to adjust the pressure in the reaction container 13 and the amount of the particulate polyamide P discharged from the reaction container, a pressure control valve can be used instead of the measuring pump 14.

In order that the raw materials are efficiently melted, the time at which heat applied to the raw materials and the compressible fluid in the reaction container 13 or the time at which the raw materials and the compressible fluid in the reaction container 13 are stirred may be adjusted. In this regard, heating and stirring can be performed after contacting the raw materials with the compressible fluid or while contacting the raw materials with the compressible fluid.

Next, a batch polymerization reaction apparatus 200 will be described by reference to FIG. 4. FIG. 4 is a system diagram illustrating a batch polymerization system for use in producing the particulate polyamide of this disclosure.

Figure 4:
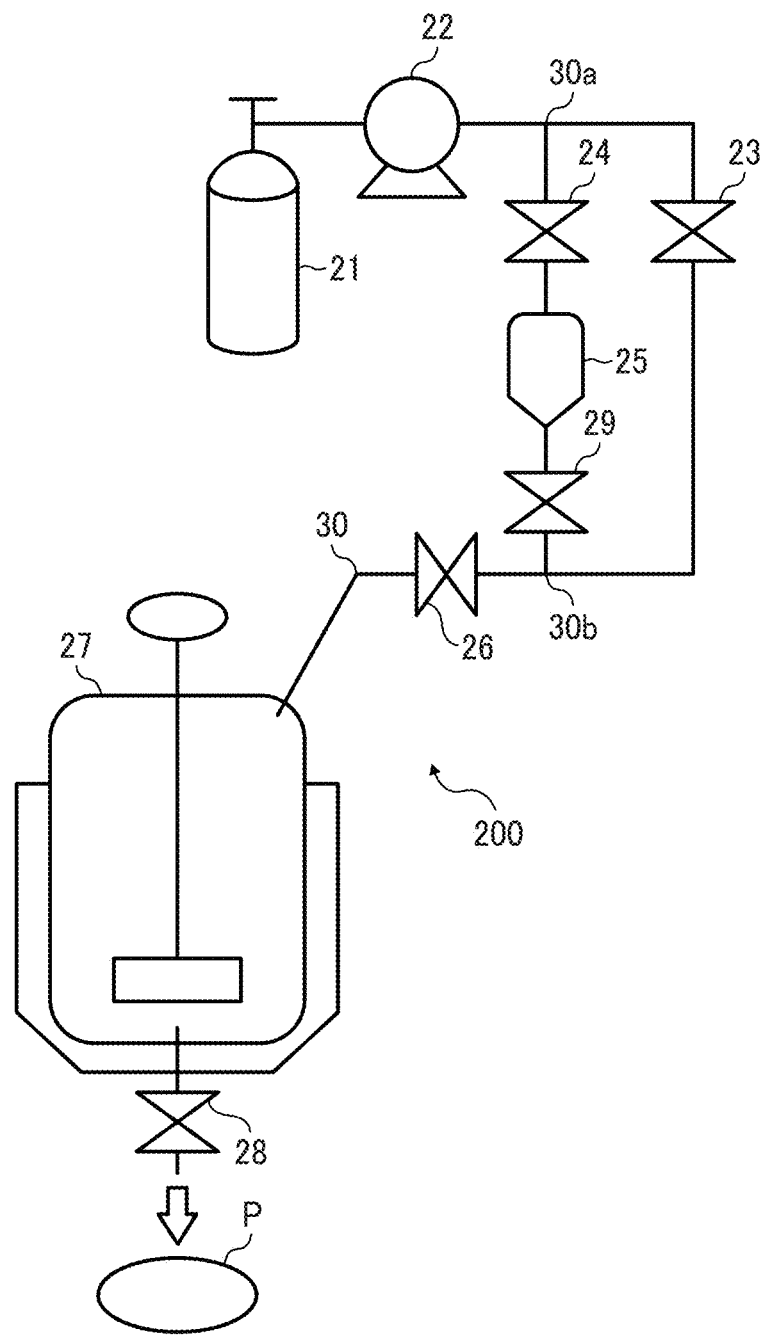
FIG. 4 is a schematic view illustrating a batch polymerization system for use in producing the particulate polyamide.

Referring to FIG. 4, the polymerization reaction apparatus 200 includes a tank 21, a measuring pump 22, an addition pot 25, a reaction container 27, and valves 23, 24, 26, 28 and 29. These devices are connected with the pressure-resistant pipe 30. In addition, joints 30a and 30b are provided on the pipe 30.

The tank 21 stores a compressible fluid. The tank 21 can store a gas or a solid, which can be changed to a compressible fluid by being heated or pressed in a passage to the reaction container 27 or in the reaction container 27. In this case, when the gas or solid stored in the tank 21 is heated or pressed, the gas or solid achieves the state (1), (2) or (3) illustrated in FIG. 2 in the reaction container 27.

A measuring pump 22 supplies the compressible fluid stored in the tank 21 to the reaction container 27 at a predetermined pressure and a predetermined flow rate. An addition pot 25 stores an activating agent to be added to the raw materials in the reaction container 27. The valves 23, 24, 26 and 29 perform switching between a passage through which the compressible fluid in the tank 21 is fed to the reaction container 27 via the addition pot 25, and a passage through which the compressible fluid in the tank 21 is fed to the reaction container 27 without passing through the addition pot 25, or the like switching.

Before starting polymerization, the base material mixture is contained in the reaction container 27. The reaction container 27 is a pressure-resistant container in which the base material mixture previously contained in the container is contacted with the compressible fluid supplied from the tank 21 and the activating agent supplied from the addition pot 25 to subject the monomer (2-pyrrolidone and/or 2-azetidinone) to ring-opening polymerization. The reaction container 27 can have a gas outlet from which a vaporized material is removed. In addition, the reaction container 27 has a heater to heat the raw materials and the compressible fluid. Further, the reaction container 27 has a stirrer to stir the raw materials and the compressible fluid to prevent occurrence of a problem in that the produced polymer precipitates in the reaction container due to difference in density between the raw materials and the polymer, and therefore the polymerization reaction can be evenly performed in a quantitative way. The valve 28 has a function of discharging the particulate polyamide P from the reaction container 27 when the valve is opened after the polymerization reaction is completed.

Next, the method of preparing the particulate polyamide using the above-mentioned raw materials, the compressible fluid, and the polymerization reaction apparatus 100, which is an example of the polymerization reaction apparatus, will be described. According to the method, the base material mixture including a monomer including 2-pyrrolidone and/or 2-azetidinone, and a basic polymerization catalyst are contacted with the compressible fluid to melt or dissolve the base material mixture in the compressible fluid and to subject the monomer to ring-opening polymerization.

Initially, the measuring feeders 2 and 4 and the measuring pumps 6 and 8 are operated to continuously supply the base material mixture, the compressible fluid, and optional activating agent and additives, which are stored in the tanks 1, 3, 5 and 7, to the mixer 9 through the respective inlets 9a, 9b, 9c and 9d. In general, accuracy of measuring a solid (powdery or particulate material) is relatively low compared to accuracy of measuring a liquid. Therefore, when a solid raw material is used, it is preferable that the solid raw material is heated to a temperature higher than the melting point of the raw material so that the liquefied raw material is contained in the tank 5 so as to be supplied to the mixer 9 by the measuring pump 6. The order of activation of the measuring feeders 2 and 4 and the measuring pumps 6 and 8 is not particularly limited, but it is preferable that the measuring pump 8 is initially activated because when the raw materials are fed to the reaction container 13 without being contacted with the compressible fluid, the raw materials may be solidified due to drop in temperature of the raw materials and the reaction is unevenly performed.

The supplying speeds at which the raw materials are supplied by the measuring feeders 2 and 4 and the measuring pump 6 are controlled based on the ratio of the base material mixture, the activating agent, and the additives so that the ratio of the raw materials becomes a predetermined ratio. Specifically, the total weight of the raw materials supplied by the measuring feeders 2 and 4 and the measuring pump 6 per a unit time (i.e., supplying speed of raw materials in units of g/min) is adjusted based on factors such as the desired property of the polymer and the reaction time. Similarly, the weight of the compressible fluid supplied by the measuring pump 8 per a unit time (i.e., supplying speed of compressible fluid in units of g/min) is also adjusted based on factors such as the desired property of the polymer and the reaction time. The ratio Sr/Sc (feed ratio) of the supplying speed (Sr) of the raw materials to the supplying speed (Sc) of the compressible fluid is not particularly limited, and is properly determined.

The mixing ratio of the weight (Wm) of the monomer to the weight (Wc) of the compressible fluid, which mixing ratio is defined by the below-mentioned equation (1), is preferably not greater than 0.3.

$$\text{Mixing ratio} = Wm/(Wm+Wc) \tag{1}$$

The mixing ratio is more preferably from 0.001 to 0.3, and even more preferably from 0.01 to 0.3.

Since the raw materials and the compressible fluid are continuously supplied to the container of the mixer 9, the raw materials and the compressible fluid are continuously contacted with each other. Therefore, the raw materials such as the base material mixture, the activating agent, and the additives are dissolved or melted in the compressible fluid in the mixer 9. In this regard, when the mixer 9 has a stirrer, the raw materials and the compressible fluid may be stirred. In order to prevent the supplied compressible fluid from changing to a gas, the temperature and the pressure in the reaction container 13 are controlled so as to be a temperature and a pressure not lower than those of the fluid at the triple point T illustrated in FIGS. 1 and 2. In this regard, the pressure can be controlled by adjusting the flow rate of the pumps, the diameter, length and shape of the tubes. In addition, this control can be performed by adjusting the output of the heater 9e of the mixer 9 or the supplying speed of the compressible fluid.

In order that the raw materials can be efficiently mixed, the timing of heating and stirring the raw materials and the compressible fluid can be adjusted. In this regard, a method in which after the raw materials are contacted with the compressible fluid, heating and stirring are performed thereon, or a method in which the raw materials are contacted with the compressible fluid while heating and stirring are performed thereon can be used. In addition, in order to securely mix the raw materials, a method in which after the base material mixture is heated to a temperature not lower than the melting point thereof, the mixture is contacted with the compressible fluid can be used. For example, when the mixer 9 is a two shaft mixer having screws, the above-mentioned conditions can be satisfied by adjusting the arrangement of the screws, the arrangement of the inlets 9a, 9b, 9c and 9d, and the temperature of the heater 9e of the mixer.

In this embodiment, the additives are supplied to the mixer 9 separately from the base material mixture. However, the additives can be supplied together with the base material mixture. In addition, it is possible that after the polymerization reaction, the additives are supplied to the resultant polymer. In this regard, it is possible that after the particulate polyamide P is discharged from the reaction container 13, the additives are added to the polyamide.

The raw materials mixed in the mixer 9 are supplied by the feed pump 10 to the reaction container 13 through the inlet 13a.

The raw materials supplied to the reaction container 13 are fully stirred by the stirrer of the reaction container if desired. In addition, if desired, the raw materials are heated to a predetermined temperature (polymerization reaction temperature) by the heater 13e when being fed. Therefore, the monomer (2-pyrrolidone and/or 2-azetidinone) is subjected to ring-opening polymerization in the reaction container 13 in the presence of the activating agent (i.e., the polymerization process is performed). The polymerization reaction temperature of the ring-opening polymerization of the monomer is not particularly limited, and is properly determined. However, the reaction polymerization temperature is preferably from 40° C. to 70° C. When the polymerization reaction temperature is in the preferable range, problems such that the reaction speed deteriorates; and a side reaction is made hardly occur. The polymerization reaction temperature can be controlled, for example, by heating the polymerization reaction apparatus with a heater, which is provided on the apparatus, or an external heater.

In this embodiment, the polymerization reaction time (i.e., average residence time of the raw materials in the reaction container 13) is determined depending on the target molecular weight of the polymer. When the target molecular weight is from 5,000 to 10,000,000, the polymerization reaction time is generally from 30 minutes to 120 minutes.

The polymerization reaction time influences the shape of the particulate polyamide, and when the polymerization reaction time is relatively short, non-spherical particles having a notch tends to be produced.

The particulate polyamide P formed in the reaction container 13 by the ring-opening reaction is discharged from the reaction container 13 by the measuring pump 14. The measuring pump 14 preferably feeds the particulate polyamide P at a constant speed so that the pressure in the reaction container 13 filled with the compressible fluid becomes constant, and thereby the polymerization reaction is evenly performed, resulting in production of a homogeneous particulate polyamide. Therefore, the liquid feeding mechanism of the reaction container 13 and the liquid feeding rate of the feed pump 10 are controlled so that the back pressure of the measuring pump 14 becomes constant. Similarly, in order that the back pressure of the feed pump 10 becomes constant, the liquid feeding mechanism of the mixer 9 and the feeding speeds of the measuring feeders 2 and 4 and the measuring pumps 6 and 8 are controlled. In this regard, ON-OFF control methods (i.e., intermittent feeding methods) can be used for the control method, but continuous or step-by-step methods in which the rotation speed of the pumps, etc., is gradually increased or decreased are often preferably used. By using such control methods, a homogeneous particulate polyamide can be stably produced.

The thus prepared particulate polyamide P is optionally subjected to a treatment in which the monomer and catalyst remaining in the polymer are removed therefrom. The removing method used for the treatment is not particularly limited, but an extraction method using decompression distillation or using a compressible fluid, or a water washing method can be used. When an extraction method using decompression distillation is used, the decompression conditions are determined depending on the boiling point of the catalyst used. In an extraction method using a compressible fluid, after the polymerization reaction, the compressible fluid used is discharged, and the particulate polyamide is contacted with a new compressible fluid, wherein this washing operation is preferably performed plural times.

The pressure of the reaction system in the polymerization reaction (i.e., the pressure of the compressible fluid) may be the pressure at which the compressible fluid supplied from the tank 7 becomes a liquefied gas (i.e., the state (2) in FIG. 2) or a high pressure gas (i.e., the state (3) in FIG. 2), but is preferably the pressure at which the compressible fluid becomes a supercritical fluid (i.e., the state (1) in FIG. 2). When the compressible fluid is in the supercritical fluid state, melting of the base material mixture can be accelerated, and thereby the polymerization reaction can be evenly performed in a quantitative way.

The weight average molecular weight of the thus prepared polymer is preferably from 1,000 to 5,000,000.

The particulate polyamide of this disclosure can be used, for example, for cosmetics, adsorbents, catalyst bearers, electronic devices (e.g., displays), and chromatography.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

In the following example, the density of the compressible fluid, the weight average molecular weight of the polymers prepared, and the particle diameter, particle diameter dispersion degree, specific surface area and pore diameter distribution of the particulate polyamide prepared were measured by the following methods.

1. Method for Measuring Density of Compressible Fluid

The density of the compressible fluid was measured based on the method, which is described in detail in "A new equation of state for carbon dioxide covering the fluid region from the triple point temperature to 1100K at pressures up to 800 MPa" by R. Span and W. Wagner, J. Phys. Chem. Ref. Data 25, pp. 1509-1596 (1996), incorporated herein by reference.

2. Weight average molecular weight of particulate polyamide

The weight average molecular weight was measure by gel permeation chromatography (GPC) under the following conditions.

Measuring instrument: HLC-8220GPC from TOSOH CORPORATION

Column: TSK GMH$_{HR}$ from TOSOH CORPORATION

Temperature: 40° C.

Solvent: 5 mmol/l hexafluoroisopropanol solution of sodium trifluoroacetate

Flow rate: 0.2 ml/min

Initially, 1 ml of 0.05% by weight of a polymer solution was injected into the measuring instrument to measure the molecular weight distribution of the polymer under the above-mentioned conditions. The weight average molecular weight (Mw) of the polymer was calculated based on the molecular weight calibration curve, which was prepared by using monodisperse polymethyl methacrylates (PMMA).

3. Particle Diameter (d50) of Particulate Polyamide

The particle diameter (d50) was measured using a Laser Scattering Particle Size Distribution Analyzer LA-920 from Horiba Ltd. Specifically, a particulate polyamide was mixed with water and the mixture was subjected to a supersonic dispersing treatment for 10 minutes to prepare a sample. The sample was set in the measuring instrument to determine the particle diameter (d50) of the particulate polyamide.

4. Particle Diameter Dispersion Degree of Particulate Polyamide

The particle diameter dispersion degree (Dv/Dn) of a particulate polyamide was calculated from the volume average particle diameter (Dv) and the number average particle diameter (Dn) of the particulate polyamide, which were measured by the Laser Scattering Particle Size Distribution Analyzer LA-920.

5. Specific Surface Area and Pore Diameter Distribution of Particulate Polyamide The specific surface area and pore diameter distribution of a particulate polyamide were measured by a surface area and porosity analyzer TRISTAR 3020 from Shimadzu Corp. In addition, the pore diameter peak ratio ($P_H/P_L$) of the value of a peak ($P_H$) in a relatively high diameter range of not less than 100 nm to the value of a peak ($P_L$) in a relative low diameter range of not greater than 50 nm was determined by the BJH analysis method mentioned above.

The sample was subjected to reduce-pressure drying for 12 hours before measuring the specific surface area and pore diameter distribution.

6. Adhesiveness of Particulate Polyamide

The particulate polyamides of Examples 7 to 12 were evaluated with respect to adhesiveness.

Specifically, a particulate polyamide was spread on a surface of a glass plate, which was coated with an acrylic binder (DIANAL BR-116 from Mitsubishi Rayon Co., Ltd.), so that the particulate polyamide adheres to the surface of the glass plate.

After the surface was rubbed with a cloth 20 times in a back and forth manner using a rubbing tester, the surface of the glass plate was observed to determine whether or not particles of the particulate polyamide are released from the surface.

The adhesiveness was evaluated by the following method.

◎: The percentage of particles released from the surface (i.e., the area of the surface from which particles of the particulate polyamide are released) is not greater than 10%.

○: The percentage of particles released from the surface is greater than 10% and not greater than 30%.

Δ: The percentage of particles released from the surface is greater than 30% and not greater than 50%.

7. Gradual Emission Controlling Ability of Particulate Polyamide

The particulate polyamides of Examples 1 and 13 to 17 were evaluated with respect to the gradual emission controlling ability.

Initially, 100 parts by weight of a particulate polyamide and 104 parts by weight of squalane were mixed by a desk-top mixer, and the resultant mixture was further mixed by a HENSCHEL MIXER mixer. Next, a liquid paraffin, which had been heated so as to be melted, was added to the mixture. The mixture was then kneaded by a roll mill. The kneaded mixture was heated while stirred to be melted, and then cooled to 30° C., followed by adding a fragrance thereto. The mixture was poured into a metal dish, and then cooled to prepare an oil-based foundation.

Next, 500 mg of the oil-based foundation, which was precisely weighed, was added into 500 ml of refined water, and the mixture was allowed to settle at 20° C. After 1 hour, 5 hours, 10 hours, and 15 hours of mixing, the eluate was sampled, and filtered to remove the particulate material therefrom. Next, the concentration of the ingredient (i.e., squalane) in the elute was measured by high-performance liquid chromatography to determine the dissolution rate of squalane. The results are shown in Table 3 below.

In this regard, the dissolution rate described in Table 3 is determined by the following equation.

$$\text{Dissolution rate (\%)} = (W2/W1) \times 100,$$

wherein W1 represents the ingredient (squalane) bearing amount of the particulate polyamide, and W2 represents the amount of the ingredient (squalane) in the eluate.

8. Ingredient Bearing Ability

The particulate polyamides of Examples 1 and 13 to 17 were evaluated with respect to the ingredient bearing amount (i.e., the amount of ingredient which the particulate polyamide can bear therein).

The ingredient bearing ability of the particulate polyamide was calculated from the above-mentioned ingredient bearing amount, which was measured by high-performance liquid chromatography.

The ingredient bearing ability is determined by the following equation.

$$\text{Ingredient bearing ability} = (W1/W) \times 100 (\% \text{ by weight}),$$

wherein W represents the weight of the particulate polyamide, and W1 represents the ingredient (squalane) bearing amount of the particulate polyamide (i.e., the amount of ingredient which the particulate polyamide bears therein).

The ingredient bearing ability is graded as follows.

◎: The ingredient bearing ability is not less than 30% by weight.

○: The ingredient bearing ability is not less than 20% by weight.

Δ: The ingredient bearing ability is not less than 10% by weight.

X: The ingredient bearing ability is less than 10% by weight.

Example 1

The following components were fed into a flask equipped with a decompressing device.

| | |
|---|---|
| 2-Pyrrolidone (which was refined to remove water therefrom) | 21.3 g (0.25 mol) |
| Potassium t-butoxide serving as a catalyst | 0.346 g (3 mmol) |

The mixture was heated to 50° C. to react the catalyst. As a result, a mixture of 2-pyrrolidone and a potassium salt of 2-pyrrolidone was obtained.

Next, the ring-opening polymerization of 2-pyrrolidone was performed using the polymerization reaction apparatus 200 illustrated in FIG. 4. The configuration of the polymerization reaction apparatus 200 was the following.

Tank 21: carbon dioxide ($CO_2$) bottle

Addition pot 25: ¼-inch SUS 316 pipe sandwiched by the valves 24 and 29 was used as the addition pot. The addition pot was preliminarily filled with 0.54 g of an activating agent 1-acetyl-2-pyrrolidone.

Reaction container 27: A 100 ml pressure resistant SUS 316 container was used as the reaction container. The reaction container was preliminarily filled with 12.15 g of the base material mixture.

The measuring pump 22 was operated while the valves 23 and 26 were opened to directly supply carbon dioxide stored in the tank 21 to the reaction container 27 without using the addition pot 25. The temperature inside the reaction container 27 was controlled at 40° C., and carbon dioxide was fed into the reaction container in an amount such that the pressure of carbon dioxide becomes 6 MPa to melt the base material mixture. Next, the valve 23 was closed and the measuring pump 22 was operated. When the pressure between the measuring pump 22 and the valve 24 became higher than the pressure in the reaction container 27, the valves 24 and 29 were opened to supply 1-acetyl-2-pyrrolidone in the addition pot 25 to the reaction container 27. Further, after the pressure in the reaction container 27 was increased to 9 MPa, the polymerization reaction of 2-pyrrolidone was performed in the reaction container for 120 minutes. After the polymerization reaction, the valve 28 was opened.

Next, carbon dioxide was fed again into the reaction container, and then the pressure in the reaction container was increased to 9 MPa, followed by opening the valve 28.

The particulate polyamide in the reaction container 27 was washed with water, and then the particulate polyamide was extracted from the reaction container, followed by drying the particulate polyamide.

Figure 5:
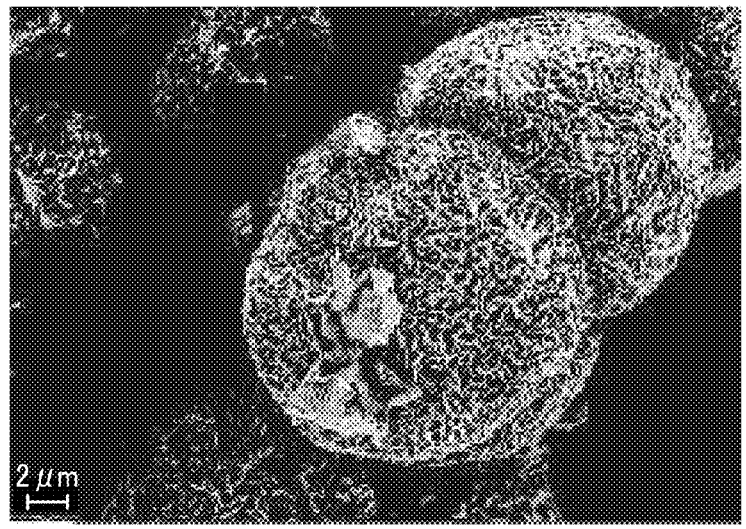
FIG. 5 is an electron micrograph of a particulate polyamide of Example 1.

The reaction conditions and the evaluation results of the particulate polyamide of Example 1 are shown in Table 1 below. In addition, an electron microscope photograph of the particulate polyamide of Example 1 is shown in FIG. 5, wherein a 2 μm scale is illustrated in the photograph. As can be understood from FIG. 5, the particulate polyamide of Example 1 was porous.

The ratio H1/D3 of the particulate polyamide when the particulate polyamide is observed from such a direction that the area of the projected image is maximal, and the ratio H1/D3 of the particulate polyamide when the particulate polyamide is observed from such a direction that the area of the projected image is minimal were 0.03 at maximum, and therefore the particulate polyamide had a circular form when observed from each of the directions. In this regard, H1 represents the true circularity degree (defined in JIS B 0621) of the projected image, and D3 represents the maximum diameter of the projected image. When the relationship (H1/D3)≤0.15 is satisfied, the particulate polyamide has a circular form.

In addition, the ratio (D1−D2)/D1 was 0.06, wherein D1 represents the maximum diameter of the particulate polyamide when the particulate polyamide is observed from such a direction that the area of the projected image is maximal, and D2 represents the maximum diameter of the particulate material when the particulate polyamide is observed from such a direction that the area of the projected image is minimal, and therefore the particulate polyamide has a spherical form.

The shell of particulate polyamide of Example 1 had a thickness of T/2, wherein T represents the outer diameter of the particulate polyamide, and therefore the particulate polyamide had no hollow therein (i.e., the particulate polyamide was a solid particle).

Figure 16:
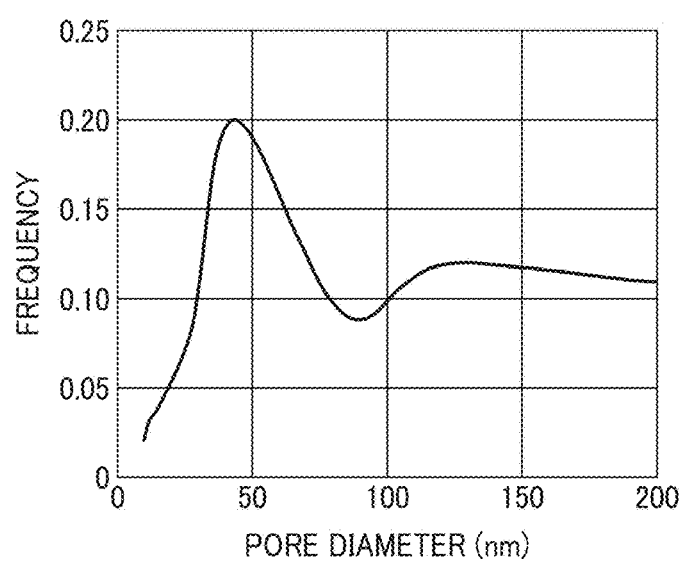
FIG. 16 is a graph illustrating the pore diameter distribution of the particulate polyamide of Example 1.

The pore diameter distribution of the particulate polyamide of Example 1 is illustrated in FIG. 16. It can be understood from FIG. 16 that the pore diameter peak ratio ($P_H/P_L$) of the value of a peak ($P_H$) in a relatively high diameter range of not less than 100 nm to the value of a peak ($P_L$) in a relatively low diameter range of not greater than 50 nm is 0.61 (61%).

Example 2

The procedure for preparation of the particulate polyamide of Example 1 was repeated except that the polymerization temperature and the polymerization pressure were changed as described in Table 1 to prepare a particulate polyamide of Example 2.

The reaction conditions and the evaluation results of the particulate polyamide of Example 2 are shown in Table 1 below.

Example 3

The procedure for preparation of the particulate polyamide of Example 1 was repeated except that the polymerization temperature and the polymerization pressure were changed as described in Table 1 to prepare a particulate polyamide of Example 3.

The reaction conditions and the evaluation results of the particulate polyamide of Example 3 are shown in Table 1.

Example 4

The procedure for preparation of the particulate polyamide of Example 1 was repeated except that 2-pyrrolidone was replaced with 2-azetidinone to prepare a particulate polyamide of Example 4.

The reaction conditions and the evaluation results of the particulate polyamide of Example 4 are shown in Table 1.

Example 5

The procedure for preparation of the particulate polyamide of Example 1 was repeated except that 2-pyrrolidone was replaced with a mixture of 2-pyrrolidon and 2-azetidinone in a weight ratio of 1/1 to prepare a particulate polyamide of Example 5.

The reaction conditions and the evaluation results of the particulate polyamide of Example 5 are shown in Table 1.

Example 6

The procedure for preparation of the particulate polyamide of Example 1 was repeated except that the polymerization temperature, the polymerization pressure and the mixing ratio of the monomer to the compressible fluid were changed as described in Table 1 to prepare a particulate polyamide of Example 6.

The reaction conditions and the evaluation results of the particulate polyamide of Example 6 are shown in Table 1.

Example 7

The procedure for preparation of the particulate polyamide of Example 1 was repeated except that the added amount of the activating agent, the polymerization pressure and the mixing ratio of the monomer to the compressible fluid were changed as described in Table 2 to prepare a particulate polyamide of Example 7.

Figure 10:
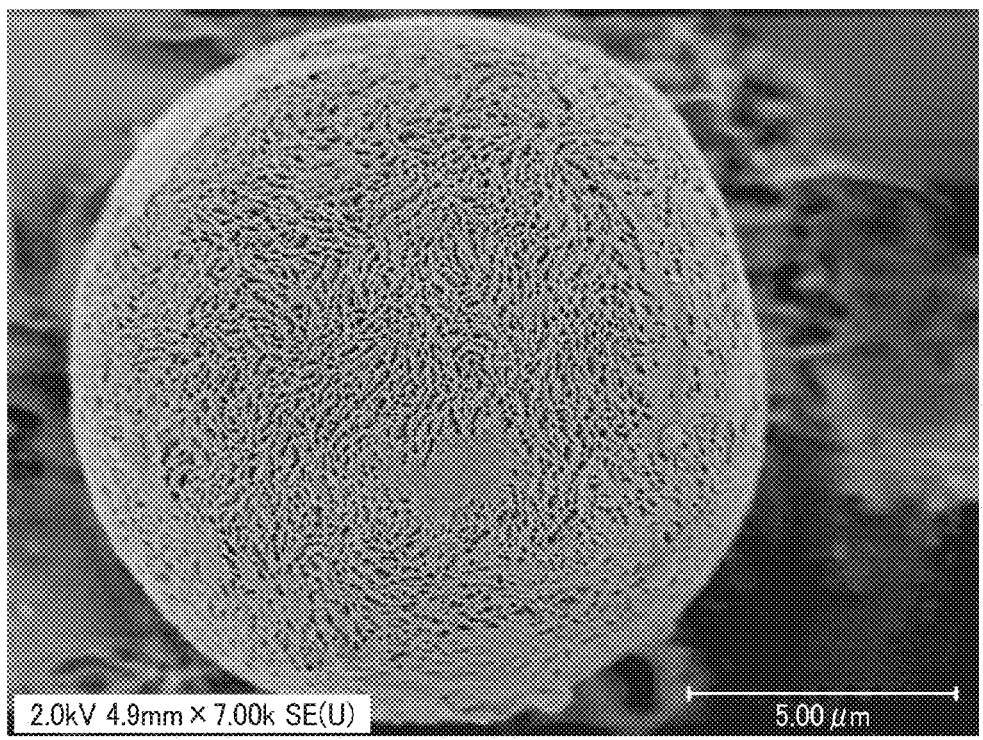
FIG. 10 is an electron micrograph of a particulate polyamide of Example 7.

The reaction conditions and the evaluation results of the particulate polyamide of Example 7 are shown in Table 2 below. In addition, an electron microscope photograph of the particulate polyamide of Example 7 is shown in FIG. 10, wherein a 5.00 μm scale is illustrated in the photograph. As can be understood from FIG. 10, the particulate polyamide of Example 7 was porous.

Example 8

The procedure for preparation of the particulate polyamide of Example 6 was repeated except that the added amount of the activating agent, the polymerization temperature, the polymerization pressure and the mixing ratio of the monomer to the compressible fluid were changed as described in Table 2 to prepare a particulate polyamide of Example 8.

Figure 11:
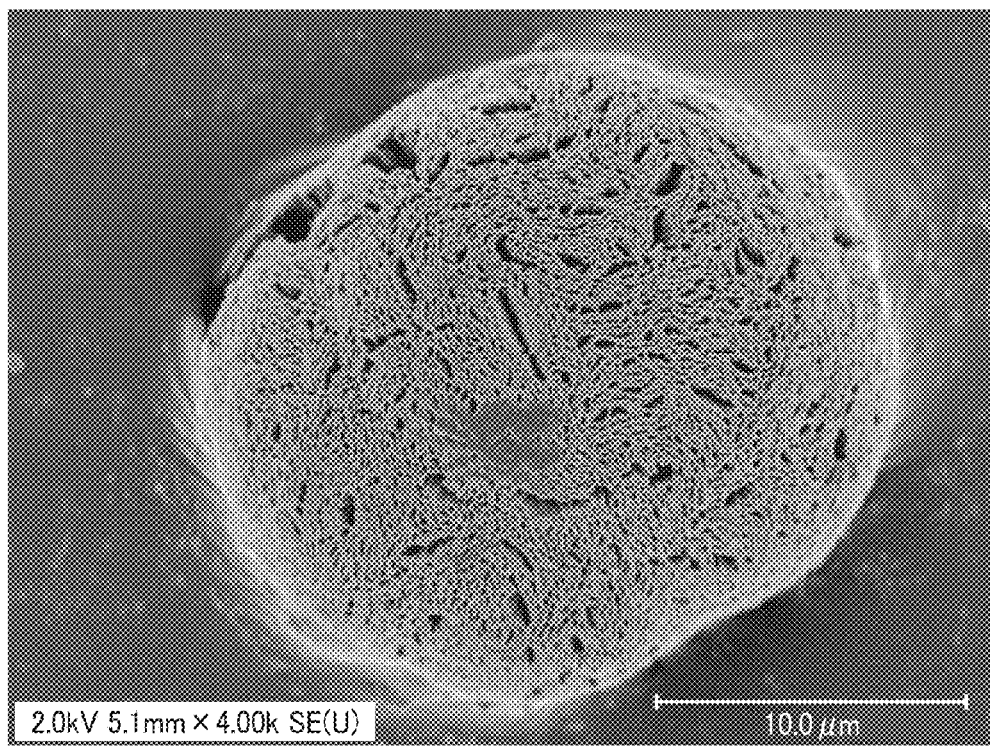
FIG. 11 is an electron micrograph of a particulate polyamide of Example 8.

The reaction conditions and the evaluation results of the particulate polyamide of Example 8 are shown in Table 2. In addition, an electron microscope photograph of the particulate polyamide of Example 8 is shown in FIG. 11, wherein a 10.0 μm scale is illustrated in the photograph. As can be understood from FIG. 11, the particulate polyamide of Example 8 was porous.

The ratio (H1/D3) of the particulate polyamide was 0.14 when the particulate polyamide was observed from such a direction that the area of the projected image is maximal, and therefore the particulate polyamide had a circular form when observed from the direction.

When the particulate polyamide was observed from such a direction that the area of the projected image is minimal, the particulate polyamide had such a form as illustrated in FIG. 7B, i.e., a form having notches, wherein the number of notches was 38, the maximum diameter A was 21.9 μm, the maximum and minimum values of the depths of the notches Bn (n=2-39) were 17.6 μm and 4.3 μm, respectively, and the maximum and minimum values of the widths of the notches Cn (n=2-39) were 3.3 μm and 0.2 μm, respectively.

Example 9

The procedure for preparation of the particulate polyamide of Example 1 was repeated except that the added amount of the activating agent, the added amount of the catalyst, the polymerization pressure, the polymerization time and the mixing ratio of the monomer to the compressible fluid were changed as described in Table 2 to prepare a particulate polyamide of Example 9.

Figure 12:
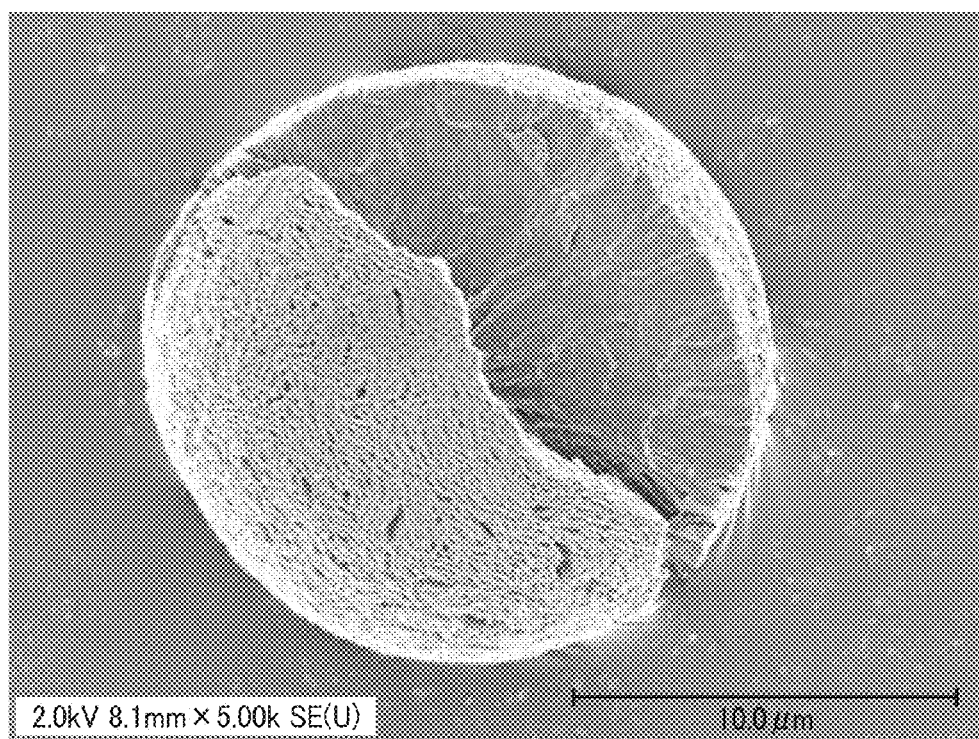
FIG. 12 is an electron micrograph of a particulate polyamide of Example 9.

The reaction conditions and the evaluation results of the particulate polyamide of Example 9 are shown in Table 2. In addition, an electron microscope photograph of the particulate polyamide of Example 9 is shown in FIG. 12, wherein a 10.0 μm scale is illustrated in the photograph. As can be understood from FIG. 12, the particulate polyamide of Example 9 was porous.

The ratio (H1/D3) of the particulate polyamide was 0.05 when the particulate polyamide was observed from such a direction that the area of the projected image is maximal, and therefore the particulate polyamide had a circular form when observed from the direction.

When the particulate polyamide was observed from such a direction that the area of the projected image is minimal, the particulate polyamide had such a form as illustrated in FIG. 6B, i.e., a form having one notch, wherein the maximum diameter A was 15.8 μm, the depth of the notch B1 was 8.3 μm, and the width of the notch C1 was 7.7 μm.

Example 10

The procedure for preparation of the particulate polyamide of Example 1 was repeated except that the added amount of the activating agent, the added amount of the catalyst and the mixing ratio of the monomer to the compressible fluid were changed as described in Table 2 to prepare a particulate polyamide of Example 10.

The reaction conditions and the evaluation results of the particulate polyamide of Example 10 are shown in Table 2. In addition, an electron microscope photograph of the particulate polyamide of Example 10 is shown in FIG. 13, wherein a 10.0 μm scale is illustrated in the photograph. As can be understood from FIG. 13, the particulate polyamide of Example 10 was porous.

The ratio (H1/D3) of the particulate polyamide was 0.08 when the particulate polyamide was observed from such a direction that the area of the projected image is maximal, and therefore the particulate polyamide had a circular form when observed from the direction.

When the particulate polyamide was observed from such a direction that the area of the projected image is minimal, the particulate polyamide had such a form as illustrated in FIG. 8B, i.e., a biconvex lens form, wherein the maximum diameter A was 12.3 μm, and the heights D and E were 4.4 μm and 5.1 μm, respectively.

Example 11

The procedure for preparation of the particulate polyamide of Example 1 was repeated except that the added amount of the activating agent, the added amount of the catalyst, the polymerization pressure and the mixing ratio of the monomer to the compressible fluid were changed as described in Table 2 to prepare a particulate polyamide of Example 11. In this regard, the polymerization pressure was changed so as to be 9 MPa in an earlier time period of from 0 minute to 60 minutes and 30 MPa in a later time period of from 60 minutes to 120 minutes.

Figure 14:
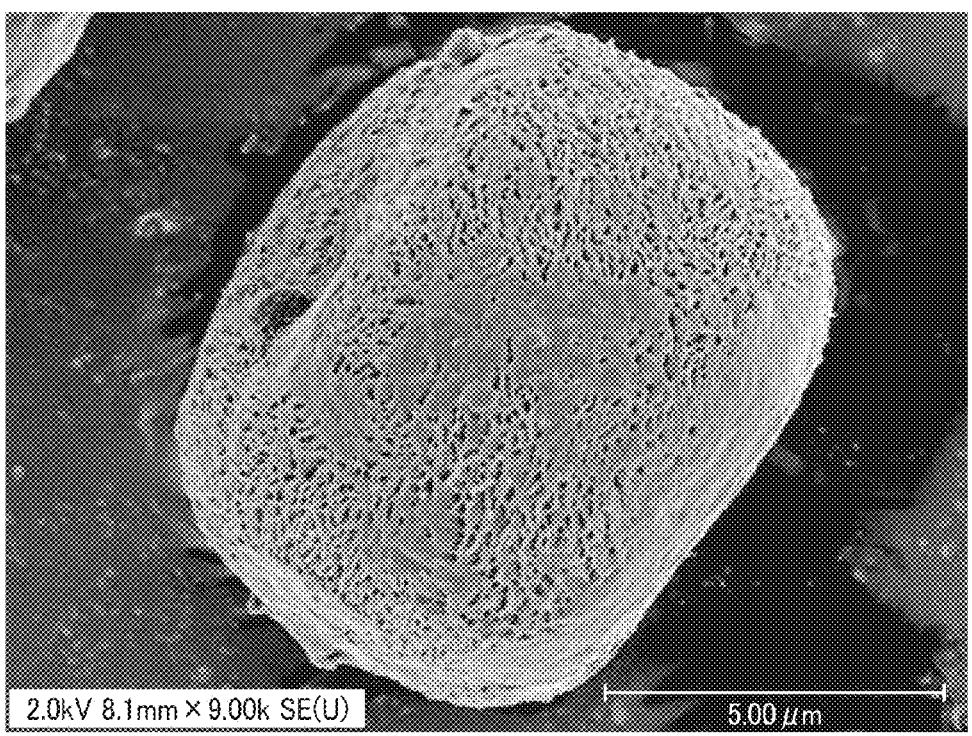
FIG. 14 is an electron micrograph of a particulate polyamide of Example 11.

The reaction conditions and the evaluation results of the particulate polyamide of Example 11 are shown in Table 2. In addition, an electron microscope photograph of the particulate polyamide of Example 11 is shown in FIG. 14, wherein a 5.00 μm scale is illustrated in the photograph. As can be understood from FIG. 14, the particulate polyamide of Example 11 was porous.

The ratio (H1/D3) of the particulate polyamide was 0.07 when the particulate polyamide was observed from such a direction that the area of the projected image is maximal, and therefore the particulate polyamide had a circular form when observed from the direction.

When the particulate polyamide was observed from such a direction that the area of the projected image is minimal, the particulate polyamide had such a form as illustrated in FIG. 9B, i.e., a bale form, wherein the maximum diameter A was 10.1 μm, and the lengths G and F were 10.1 μm and 5.8 μm, respectively.

Example 12

The procedure for preparation of the particulate polyamide of Example 1 was repeated except that the added amount of the activating agent, the added amount of the catalyst, the polymerization pressure and the mixing ratio of the monomer to the compressible fluid were changed as described in Table 2 to prepare a particulate polyamide of Example 12.

Figure 15:
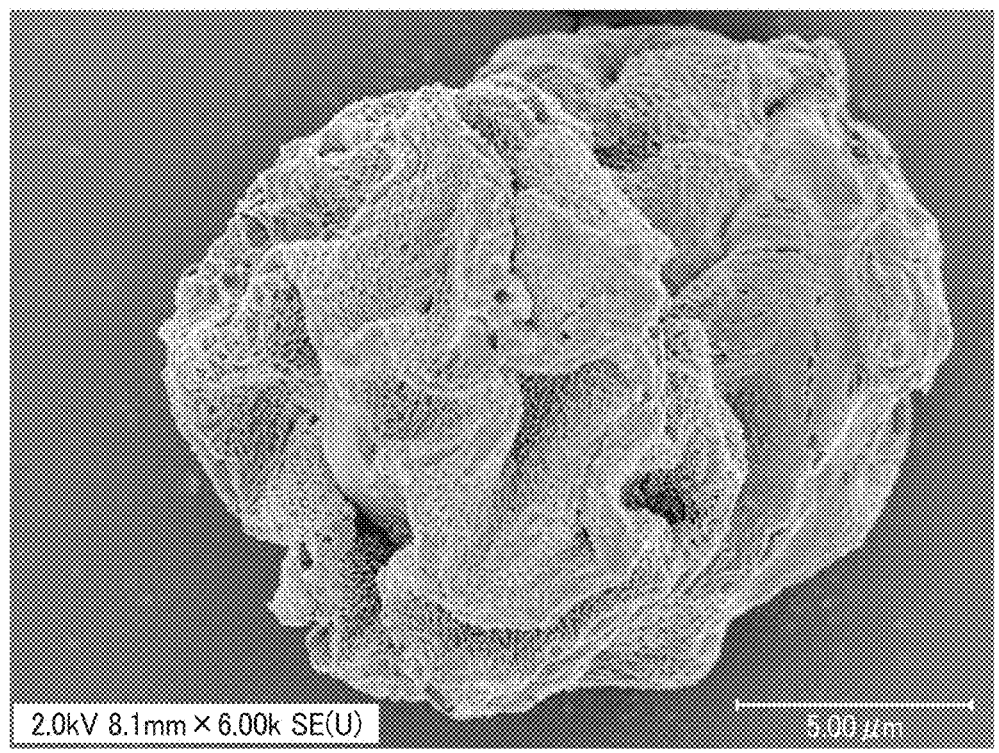
FIG. 15 is an electron micrograph of a particulate polyamide of Example 12.

The reaction conditions and the evaluation results of the particulate polyamide of Example 12 are shown in Table 2. In addition, an electron microscope photograph of the particulate polyamide of Example 12 is shown in FIG. 15, wherein a 5.00 μm scale is illustrated in the photograph. As can be understood from FIG. 15, the particulate polyamide of Example 12 was porous.

The ratio (H1/D3) of the particulate polyamide was 0.15 when the particulate polyamide was observed from such a direction that the area of the projected image is maximal, and therefore the particulate polyamide had a circular form when observed from the direction.

When the particulate polyamide was observed from such a direction that the area of the projected image is minimal, the particulate polyamide had such a form as illustrated in FIG. 7B, i.e., a form having notches, wherein the number of notches was 12, the maximum diameter A was 16.1 μm, the maximum and minimum values of the depths of the notches Bn (n=2-13) were 3.3 μm and 0.2 μm, respectively, and the maximum and minimum values of the widths of the notches Cn (n=2-13) were 5.4 μm and 0.8 μm, respectively.

Examples 13 to 17

The procedure for preparation of the particulate polyamide of Example 1 was repeated except that the added amount of the activating agent, the added amount of the catalyst, the polymerization temperature and the polymerization pressure were changed as described in Table 3 to prepare particulate polyamides of Examples 13 to 17.

The reaction conditions and the evaluation results of the particulate polyamides of Examples 13 to 17 are shown in Table 3 below.

Each of the particulate polyamides of Examples 13 to 17 had a hollow and a shell while having pores in the shell communicating with the hollow.

Figure 17:
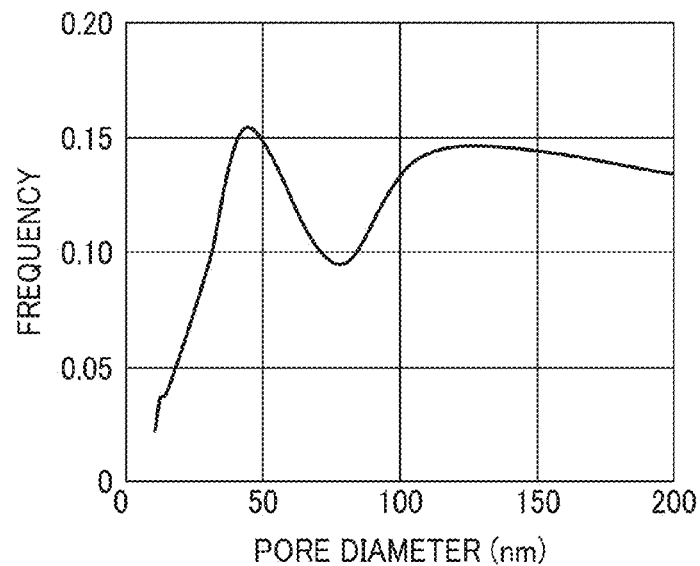
FIG. 17 is a graph illustrating the pore diameter distribution of a particulate polyamide of Example 15.

The pore diameter distribution of the particulate polyamide of Example 15 is illustrated in FIG. 17. It can be understood from FIG. 17 that the pore diameter peak ratio ($P_H/P_L$) of the value of a peak ($P_H$) in a relatively high diameter range of not less than 100 nm to the value of a peak ($P_L$) in a relatively low diameter range of not greater than 50 nm is 0.94 (94%).

Figure 18:
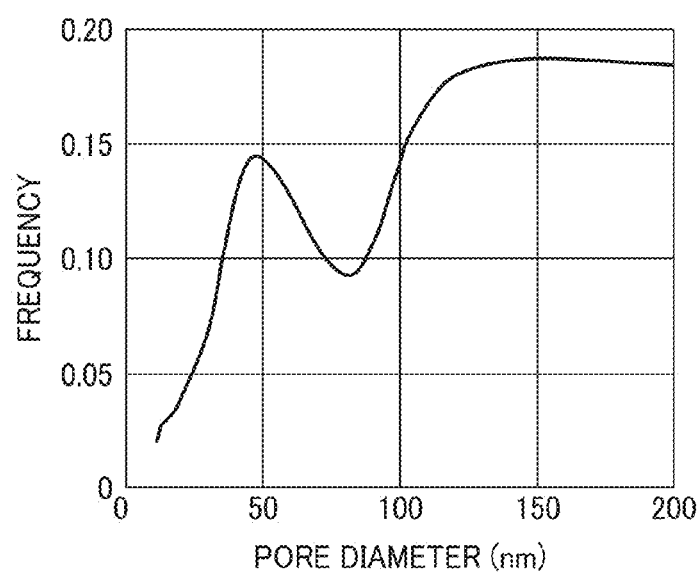
FIG. 18 is a graph illustrating the pore diameter distribution of a particulate polyamide of Example 17.

The pore diameter distribution of the particulate polyamide of Example 17 is illustrated in FIG. 18. It can be understood from FIG. 18 that the pore diameter peak ratio ($P_H/P_L$) of the value of a peak ($P_H$) in a relatively high diameter range of not less than 100 nm to the value of a peak ($P_L$) in a relatively low diameter range of not greater than 50 nm is 1.28 (128%).

Comparative Example 1

The procedure for preparation of the particulate polyamide of Example 1 was repeated except that the raw materials were not contacted with the compressible fluid to prepare a polyamide of Comparative Example 1. The polyamide of Comparative Example 1 was not particulate and had a massive form.

The reaction conditions and the evaluation results of the particulate polyamide of Comparative Example 1 are shown in Table 4 below.

Comparative Example 2

The procedure for preparation of the particulate polyamide of Example 1 was repeated except that the polymerization temperature and the polymerization pressure were changed as described in Table 4 below to prepare a particulate polyamide of Comparative Example 2.

The reaction conditions and the evaluation results of the particulate polyamide of Comparative Example 2 are shown in Table 4.

TABLE 1

|  | Ex. 1 | Ex. 2 | Ex. 3 | Ex. 4 | Ex. 5 | Ex. 6 |
|---|---|---|---|---|---|---|
| Amount of activating agent* (molar ratio) | 0.03 | 0.03 | 0.03 | 0.03 | 0.03 | 0.03 |
| Amount of catalyst** (molar ratio) | 0.01 | 0.01 | 0.01 | 0.01 | 0.01 | 0.01 |
| Polymerization temperature (° C.) | 40 | 50 | 60 | 40 | 40 | 60 |
| Polymerization pressure (MPa) | 9 | 20 | 30 | 9 | 9 | 30 |
| Polymerization time (minutes) | 120 | 120 | 120 | 120 | 120 | 120 |
| Density of compressible fluid (kg/m$^3$) | 490 | 780 | 830 | 490 | 490 | 830 |
| Mixing ratio*** | 0.2 | 0.2 | 0.2 | 0.2 | 0.2 | 0.05 |
| Weight average molecular weight (Mw) | 430,000 | 370,000 | 210,000 | 320,000 | 270,000 | 260,000 |
| Particle diameter (d50) (μm) | 53 | 47 | 55 | 51 | 47 | 63 |
| Particle diameter dispersion degree | 2.3 | 1.9 | 1.4 | 2.5 | 2.4 | 1.5 |
| Whether the polymer is porous. | Porous | Porous | Porous | Porous | Porous | Porous |
| Particle form | Spherical | Spherical | Spherical | Spherical | Spherical | Spherical |
| Maximum value of (H1/D3) | 0.03 | 0.01 | 0.04 | 0.05 | 0.06 | 0.02 |
| (D1-D2)/D1 | 0.06 | 0.02 | 0.07 | 0.09 | 0.11 | 0.04 |
| Specific surface area (m$^2$/g) | 30 | 43 | 49 | 28 | 24 | 78 |
| Pore diameter peak ratio ($P_H/P_L$) (%) | 61 | 74 | 77 | 63 | 59 | 82 |
| Whether the polymer has shell structure. | No | No | No | No | No | No |

*The amount of activating agent means a molar ratio of the activating agent to the monomer (i.e., total amount of 2-pyrrolidone and 2-azetidinone).
**The amount of catalyst means a molar ratio of the catalyst to the monomer.
***Mixing ratio means a weight ratio of the monomer to the compressible fluid.

TABLE 2

|  | Ex. 7 | Ex. 8 | Ex. 9 | Ex. 10 | Ex. 11 | Ex. 12 |
| --- | --- | --- | --- | --- | --- | --- |
| Amount of activating agent (molar ratio) | 0.02 | 0.02 | 0.02 | 0.02 | 0.02 | 0.02 |
| Amount of catalyst (molar ratio) | 0.01 | 0.01 | 0.006 | 0.006 | 0.006 | 0.003 |
| Polymerization temperature (° C.) | 40 | 40 | 40 | 40 | 40 | 40 |
| Polymerization pressure (MPa) | 30 | 20 | 20 | 9 | 9 → 30 | 20 |
| Polymerization time (minutes) | 120 | 120 | 120 | 120 | 120 | 120 |
| Density of compressible fluid ($kg/m^3$) | 910 | 840 | 840 | 490 | 490→910 | 840 |
| Mixing ratio | 0.1 | 0.1 | 0.1 | 0.1 | 0.1 | 0.1 |
| Weight average molecular weight (Mw) | 19,000 | 24,000 | 9,000 | 13,000 | 17,000 | 6,000 |
| Particle diameter (d50) (μm) | 13 | 22 | 16 | 13 | 10 | 16 |
| Particle diameter dispersion degree | 1.3 | 1.6 | 1.9 | 2.9 | 2.3 | 2.1 |
| Whether the polymer is porous. | Porous | Porous | Porous | Porous | Porous | Porous |
| Particle form | Spherical | Non-spherical | Non-spherical | Non-spherical | Non-spherical | Non-spherical |
| Maximum value of (H1/D3) | 0.00 | — | — | — | — | — |
| (D1-D2)/D1 | 0.00 | — | — | — | — | — |
| Particle form (2)* | Circular form | Slightly chipped circular form | Chipped circular form | Biconvex lens form | Bale form | Chipped circular form |
| Specific surface area ($m^2/g$) | 32 | 11 | 16 | 20 | 24 | 18 |
| Pore diameter peak ratio ($P_H/P_L$) (%) | 96 | 84 | 81 | 58 | 66 | 74 |
| Whether the polymer has shell structure. | No | No | No | No | No | No |
| Adhesiveness | Δ | ○ | ◎ | ○ | ○ | ◎ |

*Particle form (2) means the particle form of the particulate polyamide when the polyamide is observed from such a direction that the area of the projected image is minimal.

TABLE 3

|  | Ex. 1 | Ex. 13 | Ex. 14 | Ex. 15 | Ex. 16 | Ex. 17 |
| --- | --- | --- | --- | --- | --- | --- |
| Amount of activating agent (molar ratio) | 0.03 | 0.01 | 0.01 | 0.005 | 0.01 | 0.005 |
| Amount of catalyst (molar ratio) | 0.01 | 0.015 | 0.015 | 0.015 | 0.015 | 0.015 |
| Polymerization temperature (° C.) | 40 | 50 | 50 | 60 | 60 | 60 |
| Polymerization pressure (MPa) | 9 | 20 | 30 | 30 | 20 | 20 |
| Polymerization time (minutes) | 120 | 120 | 120 | 120 | 120 | 120 |
| Density of compressible fluid ($kg/m^3$) | 490 | 780 | 870 | 830 | 720 | 720 |
| Mixing ratio | 0.2 | 0.2 | 0.2 | 0.2 | 0.2 | 0.2 |
| Weight average molecular weight (Mw) | 430,000 | 12,000 | 10,000 | 5,000 | 8,500 | 6,000 |
| Particle diameter (d50) (μm) | 53 | 54 | 26 | 52 | 83 | 54 |
| Particle diameter dispersion degree | 2.3 | 1.3 | 1.5 | 1.7 | 1.4 | 2.1 |
| Whether the polymer is porous. | Porous | Porous | Porous | Porous | Porous | Porous |
| Particle form | Spherical | Spherical | Spherical | Spherical | Spherical | Spherical |
| Maximum value of (H1/D3) | 0.03 | 0.06 | 0.02 | 0.02 | 0.05 | 0.04 |
| (D1-D2)/D1 | 0.06 | 0.11 | 0.03 | 0.04 | 0.09 | 0.07 |
| Specific surface area ($m^2/g$) | 30 | 7 | 10 | 5 | 13 | 2 |

TABLE 3-continued

|  | Ex. 1 | Ex. 13 | Ex. 14 | Ex. 15 | Ex. 16 | Ex. 17 |
|---|---|---|---|---|---|---|
| Pore diameter peak ratio ($P_H/P_L$) (%) | 61 | 71 | 73 | 94 | 76 | 128 |
| Whether the polymer has shell structure. | No | Yes | Yes | Yes | Yes | Yes |
| Thickness of shell (ratio (t/T)) | 1/2 | 1/3 | 1/5 | 1/9 | 1/7 | 1/10 |
| Gradual emission controlling ability Dissolution rate (1 hr) (%) | 5 | 10 | 12 | 20 | 14 | 30 |
| Dissolution rate (5 hr) (%) | 12 | 22 | 24 | 30 | 26 | 42 |
| Dissolution rate (10 hr) (%) | 15 | 32 | 36 | 55 | 37 | 60 |
| Dissolution rate (15 hr) (%) | 18 | 33 | 40 | 70 | 44 | 80 |
| Ingredient bearing ability | X | ○ | ○ | ⊚ | ○ | ⊚ |

TABLE 4

|  | Comparative Example 1 | Comparative Example 2 |
|---|---|---|
| Amount of activating agent (molar ratio) | 0.03 | 0.03 |
| Amount of catalyst (molar ratio) | 0.01 | 0.01 |
| Polymerization temperature (° C.) | 40 | 50 |
| Polymerization pressure (MPa) | — | 10 |
| Polymerization time (minutes) | 120 | 120 |
| Density of compressible fluid (kg/m³) | — | 380 |
| Mixing ratio | — | 0.5 |
| Weight average molecular weight (Mw) | — | 340,000 |
| Particle diameter (d50) (μm) | — | 5 |
| Particle diameter dispersion degree | — | 3.6 |
| Whether the polymer is porous. | Not porous | Porous |
| Particle form | — | Spherical |
| Maximum value of (H1/D3) | — | 0.03 |
| (D1-D2)/D1 | — | 0.05 |
| Specific surface area (m²/g) | — | 13 |
| Pore diameter peak ratio ($P_H/P_L$) (%) | — | 43 |
| Whether the polymer has shell structure. | No | No |

EFFECT OF THIS DISCLOSURE

As mentioned above, a particulate polyamide, which includes a polyamide 4 and/or a polyamide 3 and which is porous while having a relatively small average particle diameter and a narrow particle diameter distribution can be provided.

This disclosure includes the following embodiments, but is not limited thereto.
(1) A particulate polyamide which includes at least one of polyamide 4 and polyamide 3 and which is porous while having a particle diameter (d50) of from 10 μm to 1,000 μm and a particle diameter dispersion degree of not greater than 3.0.
(2) The particulate polyamide descried in paragraph (1) which is characterized by having a substantially spherical form.
(3) The particulate polyamide descried in paragraph (1) which is characterized by being a non-spherical particulate polyamide which has a circular form when observed from such a direction that the area of the projected image of the particulate polyamide is maximal while having a non-circular form when observed from such a direction that the area of the projected image of the particulate polyamide is minimal.
(4) The particulate polyamide descried in paragraph (3) which is characterized in that the non-circular form is a form having a recessed portion, a hemispherical form, a polyhedral form, a biconvex lens forms, or a bale form.
(5) The particulate polyamide descried in any one of paragraphs (1) to (4) which is characterized by having a specific surface area of not less than 10 m²/g.
(6) The particulate polyamide descried in any one of paragraphs (1) to (5) which is characterized by having a pore diameter peak ratio ($P_H/P_L$) of not less than 0.7, wherein $P_H$ represents the height of a peak in a relatively high diameter range of not less than 100 nm to $P_L$ represents the height of a peak in a relatively low diameter range of not greater than 50 nm.
(7) The particulate polyamide descried in any one of paragraphs (1) to (6) which is characterized by having a shell structure such that a hollow is present in a shell, wherein the ratio of the thickness of the shell to the outer diameter of the particulate polyamide is from 1/10 to 1/3.
(8) The particulate polyamide descried in paragraph (7) which is characterized in that the hollow is communicated with pores in the shell.
(9) A method of preparing the particulate polyamide described in paragraph (1) including contacting a base material mixture including a monomer including at least one of 2-pyrrolidone and 2-azetidinone, and a basic polymerization catalyst with a compressible fluid having a density of not less than 450 kg/m³, and including carbon dioxide to melt or dissolve the base material mixture in the compressible fluid and to subject the monomer to a ring-opening polymerization reaction.
(10) The method described in paragraph (9) which is characterized in that the density of the compressible fluid is not less than 800 kg/m³.
(11) The method described in paragraph (9) or (10) which is characterized in that the mixing ratio of the monomer to the compressible fluid is not greater than 0.3 by weight.
(12) The method described in any one of paragraphs (9) to (11) which is characterized by further including contacting the ring-opening polymerization reaction product with a compressible fluid including carbon dioxide to remove a reaction residue from the ring-opening polymerization reaction product.

(13) The method described in any one of paragraphs (9) to (11) which is characterized by further including contacting the ring-opening polymerization reaction product with water to remove a reaction residue from the ring-opening polymerization reaction product.

Additional modifications and variations of the present invention are possible in light of the above teachings. It is therefore to be understood that within the scope of the appended claims the invention may be practiced other than as specifically described herein.

What is claimed is:

1. A particulate polyamide comprising polyamide 3, wherein
the particulate polyamide is porous and has a particle diameter (d50) of from 10 µm to 1,000 µm and a particle diameter dispersion degree (Dv/Dn) of not greater than 3.0, wherein Dv represents a volume average particle diameter of the particulate polyamide and Dn represents a number average particle diameter of the particulate polyamide.

2. The particulate polyamide according to claim 1, wherein the particulate polyamide has a substantially spherical form.

3. A particulate polyamide comprising at least one of polyamide 4 and polyamide 3, wherein
the particulate polyamide is porous and has a particle diameter (d50) of from 10 µm to 1,000 µm and a particle diameter dispersion degree (Dv/Dn) of not greater than 3.0, wherein Dv represents a volume average particle diameter of the particulate polyamide and Dn represents a number average particle diameter of the particulate polyamide, and wherein
the particulate polyamide is a non-spherical particulate polyamide which has a circular form when observed from such a direction that an area of a projected image of the particulate polyamide is maximal while having a non-circular form when observed from such a direction that the area of the projected image of the particulate polyamide is minimal.

4. The particulate polyamide according to claim 3, wherein the non-circular form is a form having a recessed portion, a hemispherical form, a polyhedral form, a biconvex lens forms, or a bale form.

5. The particulate polyamide according to claim 1, wherein the particulate polyamide has a specific surface area of not less than 10 m2/g.

6. The particulate polyamide according to claim 1, wherein the particulate polyamide has a pore diameter peak ratio (PH/PL) of not less than 0.7, wherein PH represents a height of a peak in a relatively high diameter range of not less than 100 nm to PL represents a height of a peak in a relatively low diameter range of not greater than 50 nm.

7. A particulate polyamide comprising at least one of polyamide 4 and polyamide 3, wherein
the particulate polyamide is porous and has a particle diameter (d50) of from 10 µm to 1,000 µm and a particle diameter dispersion degree (Dv/Dn) of not greater than 3.0, wherein Dv represents a volume average particle diameter of the particulate polyamide and Dn represents a number average particle diameter of the particulate polyamide, and wherein
the particulate polyamide has a shell structure such that a hollow is present in a shell, wherein a ratio of a thickness of the shell to an outer diameter of the particulate polyamide is from 1/10 to 1/3.

8. The particulate polyamide according to claim 7, wherein the hollow is communicated with pores in the shell.

9. A method of preparing the particulate polyamide according to claim 7, comprising:
contacting a base material mixture, which includes a monomer including at least one of 2-pyrrolidone and 2-azetidinone, and a basic polymerization catalyst, with a compressible fluid having a density of not less than 450 kg/m3 and including carbon dioxide to melt or dissolve the base material mixture in the compressible fluid and to subject the monomer to a ring-opening polymerization reaction.

10. The method according to claim 9, wherein the compressible fluid has a density of not less than 800 kg/m3.

11. The method according to claim 9, wherein a mixing ratio of the monomer to the compressible fluid is not greater than 0.3 by weight.

12. The method according to claim 9, further comprising:
contacting a ring-opening polymerization reaction product with a compressible fluid including carbon dioxide to remove a reaction residue from the ring-opening polymerization reaction product.

13. The method according to claim 9, further comprising:
contacting a ring-opening polymerization reaction product with water to remove a reaction residue from the ring-opening polymerization reaction product.

14. The particulate polyamide according to claim 7, wherein the particulate polyamide has a substantially spherical form.

15. The particulate polyamide according to claim 7, wherein the particulate polyamide has a specific surface area of not less than 10 m2/g.

16. The particulate polyamide according to claim 7, wherein the particulate polyamide has a pore diameter peak ratio (PH/PL) of not less than 0.7, wherein PH represents a height of a peak in a relatively high diameter range of not less than 100 nm to PL represents a height of a peak in a relatively low diameter range of not greater than 50 nm.

17. The particulate polyamide according to claim 3, wherein the particulate polyamide has a specific surface area of not less than 10 m2/g.

18. The particulate polyamide according to claim 3, wherein the particulate polyamide has a pore diameter peak ratio (PH/PL) of not less than 0.7, wherein PH represents a height of a peak in a relatively high diameter range of not less than 100 nm to PL represents a height of a peak in a relatively low diameter range of not greater than 50 nm.

19. A method of preparing the particulate polyamide according to claim 3, comprising:
contacting a base material mixture, which includes a monomer including at least one of 2-pyrrolidone and 2-azetidinone, and a basic polymerization catalyst, with a compressible fluid having a density of not less than 450 kg/m3 and including carbon dioxide to melt or dissolve the base material mixture in the compressible fluid and to subject the monomer to a ring-opening polymerization reaction.

20. A method of preparing the particulate polyamide according to claim 1, comprising:
contacting a base material mixture, which includes a monomer including 2-azetidinone, and a basic polymerization catalyst, with a compressible fluid having a density of not less than 450 kg/m3 and including carbon dioxide to melt or dissolve the base material mixture in the compressible fluid and to subject the monomer to a ring-opening polymerization reaction.

* * * * *